US009677755B1

(12) United States Patent
Linnell et al.

(10) Patent No.: US 9,677,755 B1
(45) Date of Patent: Jun. 13, 2017

(54) CONTROLLING THREE-DIMENSIONAL LIGHTING ARRANGEMENTS

(71) Applicant: Stowell Linnell, LLC, San Francisco, CA (US)

(72) Inventors: Jeffrey Linnell, San Francisco, CA (US); Michael Beardsworth, San Francisco, CA (US); Ian Sherman, San Francisco, CA (US)

(73) Assignee: Autofuss, San Francisco, CA (US)

( * ) Notice: Subject to any disclaimer, the term of this patent is extended or adjusted under 35 U.S.C. 154(b) by 588 days.

(21) Appl. No.: 14/213,756

(22) Filed: Mar. 14, 2014

(51) Int. Cl.
  *F21V 33/00* (2006.01)
  *H05B 37/02* (2006.01)
  *G06F 3/038* (2013.01)

(52) U.S. Cl.
  CPC ....... *F21V 33/0052* (2013.01); *H05B 37/029* (2013.01); *G06F 3/038* (2013.01)

(58) Field of Classification Search
  CPC .... F21V 33/0052; H05B 37/029; G06F 3/038
  See application file for complete search history.

(56) References Cited

U.S. PATENT DOCUMENTS

| 5,307,295 | A  | 4/1994 | Taylor et al. |
| 7,202,613 | B2 | 4/2007 | Morgan et al. |
| 7,358,929 | B2 | 4/2008 | Mueller et al. |
| 7,502,034 | B2 | 3/2009 | Chemel et al. |
| 8,457,502 | B2 | 6/2013 | Ryan et al. |

*Primary Examiner* — Y M. Lee
(74) *Attorney, Agent, or Firm* — McDonnell Boehnen Hulbert & Berghoff LLP

(57) ABSTRACT

Example methods and systems for controlling three-dimensional lighting arrangements are described. One example method includes a method is provided that involves (1) receiving by a computing system location data indicating a respective location of each of a plurality of light sources within a volume, (2) receiving by the computing system an indication to provide a geometric lighting arrangement, where the geometric lighting arrangement comprises a plurality of points having a pre-determined spatial relationship, (3) determining by the computing system a respective location, within the volume, of each point in the geometric lighting arrangement, where at least one of the light sources corresponds to each point, and (4) for each light source that corresponds to one of the points, controlling by the computing system the light source such that a light beam from the light source illuminates the location of the corresponding point within the volume.

20 Claims, 15 Drawing Sheets

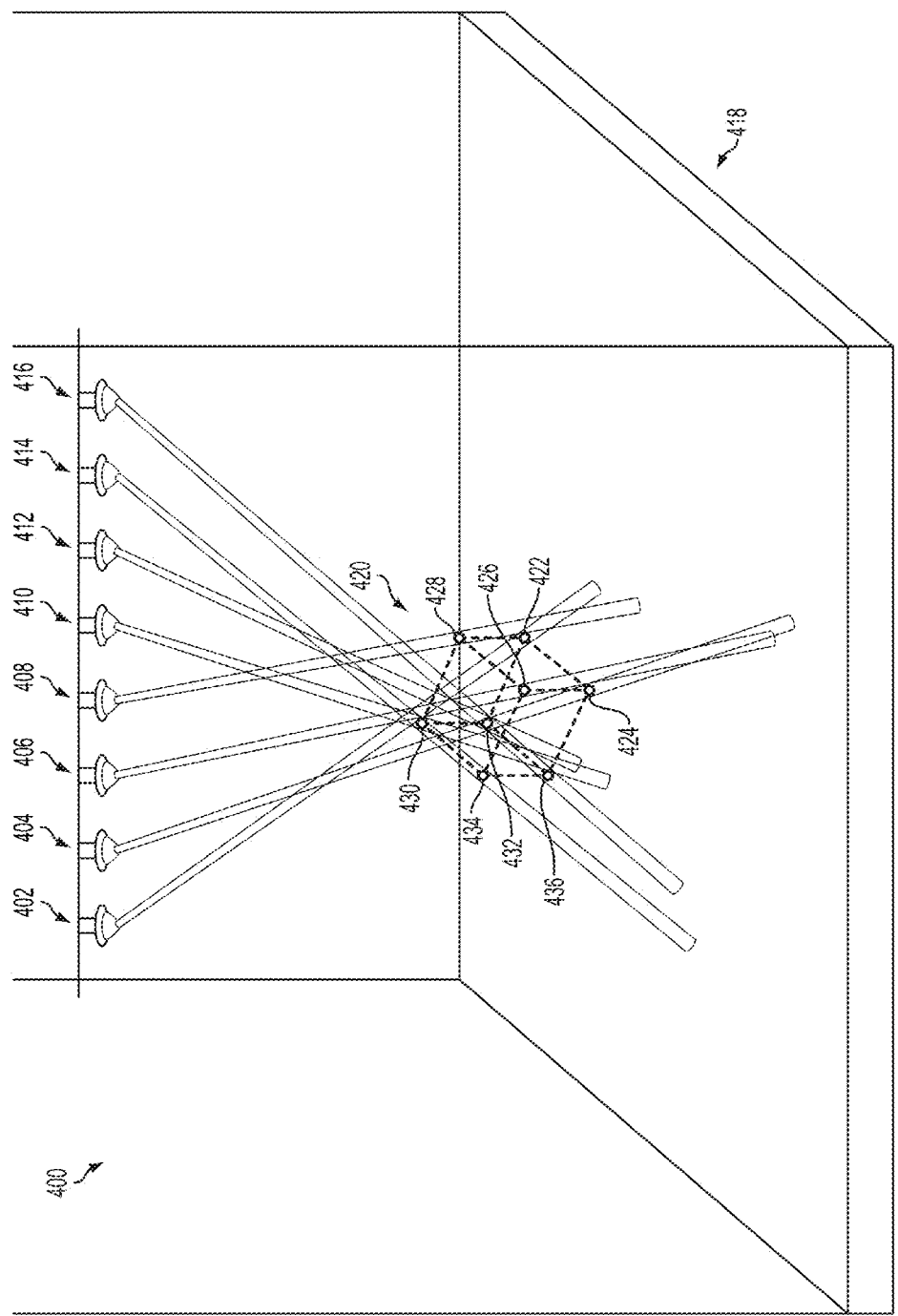

CONTROLLING THREE-DIMENSIONAL LIGHTING ARRANGEMENTS

BACKGROUND

Unless otherwise indicated herein, the materials described in this section are not prior art to the claims in this application and are not admitted to be prior art by inclusion in this section.

Projected beams of light are sometimes used in the performance industry to create laser light shows. For instance, a light show may consist of projected light beams to accompany a musical performance or some other type of performance. Laser projectors or other lighting fixtures may be used to project different types of light beams, such as light beams with different colors or frequencies. A computing device may be used to control the projectors through a standard protocol for stage lighting and effects, such as DMX, in order to control aspects of a light show, including directions, sizes, colors, and patterns of projected light beams.

SUMMARY

Traditionally, the orientations of moving head lights are programmed by specifying values for their pan and tilt channels. Example embodiments relate to a lighting control system that helps to control lighting in a volume. More specifically, an example lighting control system allows for control of patterns formed by light beams from various light sources in a three-dimensional coordinate system, rather than restricting control of such patterns in two dimensions, as current lighting systems typically do. In particular, an example control system may allow a lighting designer to specify a point on a 3-D space that a light source should emit light towards, and then the control system may determine pan and tilt settings that correspond to the specified 3-D point. These operations may be performed for multiple light sources and thereby allow the lighting designer to create 3-D lighting arrangements.

In one embodiment, a method is provided that involves (1) receiving by a computing system location data indicating a respective location of each of a plurality of light sources within a volume, (2) receiving by the computing system an indication to provide a geometric lighting arrangement, where the geometric lighting arrangement comprises a plurality of points having a pre-determined spatial relationship, (3) determining by the computing system a respective location, within the volume, of each point in the geometric lighting arrangement, where at least one of the light sources corresponds to each point, and (4) for each light source that corresponds to one of the points, controlling by the computing system the light source such that a light beam from the light source illuminates the location of the corresponding point within the volume.

In another embodiment, a system is provided that includes (1) an interface configured to communicate control instructions to a plurality of light sources and (2) a control system configured to (a) receive location data indicating a respective location of each light source within a volume, (b) receive an indication to provide a geometric lighting arrangement, where the geometric lighting arrangement comprises a plurality of points having a pre-determined spatial relationship, (c) determine a respective location, within the volume, of each point in the geometric lighting arrangement, where at least one of the light sources corresponds to each point, and (d) for each light source that corresponds to one of the points, control the light source such that a light beam from the light source illuminates the location of the corresponding point within the volume.

In still another embodiment, a non-transitory computer-readable medium having stored therein instructions that when executed by a computing system, cause the computing system to perform functions is disclosed, the functions including (1) receiving location data indicating a respective location of each of a plurality of light sources within a volume, (2) receiving an indication to provide a geometric lighting arrangement, where the geometric lighting arrangement comprises a plurality of points having a pre-determined spatial relationship, (3) determining a respective location, within the volume, of each point in the geometric lighting arrangement, where at least one of the light sources corresponds to each point, and (4) for each light source that corresponds to one of the points, controlling the light source such that a light beam from the light source illuminates the location of the corresponding point within the volume.

In yet another example, a system may include (1) means for receiving location data indicating a respective location of each of a plurality of light sources within a volume, (2) means for receiving an indication to provide a geometric lighting arrangement, where the geometric lighting arrangement comprises a plurality of points having a pre-determined spatial relationship, (3) means for determining a respective location, within the volume, of each point in the geometric lighting arrangement, where at least one of the light sources corresponds to each point, and (4) for each light source that corresponds to one of the points, means for controlling the light source such that a light beam from the light source illuminates the location of the corresponding point within the volume.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIGS. 4A-4C each show an example illustration of light sources projecting respective light beams to create a 3-D lighting arrangement.

DETAILED DESCRIPTION

I. Overview

Figure 1A:
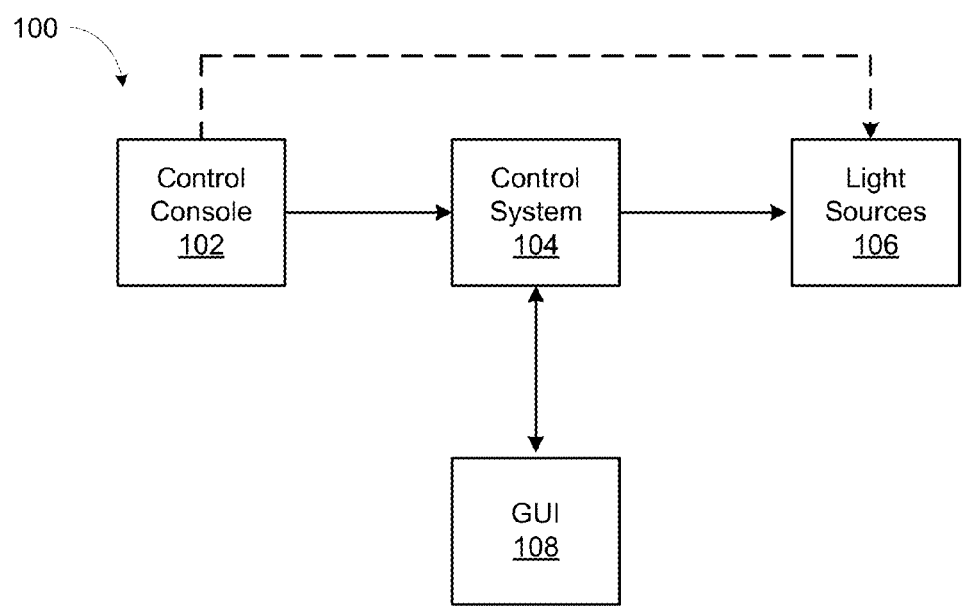
FIG. 1A illustrates a block diagram of a lighting system, according to an example embodiment.

Examples of methods and systems are described herein. It should be understood that the words "example" and "exemplary" are used herein to mean "serving as an example, instance, or illustration." Any embodiment or feature described herein as "exemplary" is not necessarily to be construed as preferred or advantageous over other embodiments or features. The example or exemplary embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Light sources capable of projecting light beams on a stage can be used for a number of applications, such as to create a light show as part of a performance. Such light sources may be movable so as to allow a lighting designer to create lighting patterns.

Example embodiments described herein relate to a lighting control system that may allow a lighting designer to create complex lighting patterns in a volume. The volume may be a three-dimensional space where the lighting designer will perform a light show, such as a performance venue. The venue may include existing light sources positioned in various locations within the venue and may include an existing lighting control console ("lighting desk") configured to control the light sources. The lighting control console may be configured to output control signals (e.g., pan and tilt signals) to the light sources, perhaps according to a given communication protocol, such as Digital Multiplex (DMX) 512.

According to the present disclosure, an example control system may allow for the use of an existing lighting control console, which typically outputs two-dimensional control signals, to control existing light sources to create three-dimensional lighting patterns. In other implementations, an example control system may take the place of an existing lighting control console altogether.

In any event, an example control system may take the definition of a volume and/or the locations and orientations of various light sources in the volume as an input, and automatically adjust light control schemes for the particular volume and/or for the particular arrangement of light sources. By doing so, the example control system may help to simplify the replication of complicated lighting patterns in venues of different sizes, which have different pre-existing arrangements of light sources.

Further, an example control system may allow for creation of 3-D lighting arrangements, which may each be referred to as a "geometric lighting arrangement" (or simply as a "geometric"). A geometric may include a pre-determined lighting arrangement (or pattern) that has been modified by a lighting designer. A pre-determined lighting arrangement may be referred to as a "geometric primitive" (or simply as a "primitive"). Herein, a primitive may be a set of points or vertices with a pre-determined spatial relationship to one another. In example implementations, the vertices or points in a particular primitive may define a particular shape. For example, a given primitive could define a rectangle, a triangle, or an ellipsoid, among other possibilities. Further, a spatial relationship between points in a primitive could be two-dimensional (e.g., such that the points are all on the same plane) or three-dimensional (e.g., points arranged along the edges of a cube or in another 3-D geometry).

An example control system may be configured to control a plurality of light sources, which can be in various arrangements, such that the light beams from the light sources illuminate a geometric at a particular position within a volume. More specifically, the control system may determine a respective location (e.g., (x, y, z) coordinates), within the volume, and orientation of each of a number of light sources in a venue. Further, the control system may determine a particular position of a geometric in the volume and in turn, may also determine the location of each point in the geometric. The control system may also assign one (or possibly more than one) of the light sources to each point in the geometric. The control system may then control the light sources such that a light beam from each light source illuminates the location of the corresponding point within the volume.

Further, an example control system may be configured to control light sources according to three-dimensional transformations of a geometric. For example, a geometric could be translated (moved up, down, left, right, or diagonally) and/or rotated (e.g., about x-, y-, or z-axis), while maintaining the pre-determined spatial relationship, and/or scaled (made larger or smaller within a given plane). To execute such transformations, an example control system may generate a sequence of (x, y, z) coordinates for each point in the geometric that transform the geometric in a desired manner and may then control the light sources according to the desired transformation.

Example systems and methods therefore may allow for generating and controlling 3-D lighting arrangements in an environment, such as a stage of a performance venue. A 3-D lighting arrangement may then be transformed to create elaborate lighting visualizations, such as during a laser light show or other type of performance.

II. Example Lighting Systems

FIG. 1A is a block diagram of a lighting system 100, according to an example embodiment. The lighting system 100 may be implemented within a space, such as a venue, and in particular, the lighting system 100 or aspects thereof may be positioned on, for example, a stage within the venue.

As shown, the lighting system 100 includes a control console 102, a control system 104, one or more light sources 106, and a graphical user interface (GUI) 108. These components may be electrically connected as shown in the figure. For example, the control console 102 may pass signals to the control system 104 that in turn may pass signals to the light sources 106 and the GUI 108. The GUI 108 may send signals to the control system 104. In some examples, the control console 102 may send certain signals directly to the light sources 106. It should be understood that the lighting system 100 may include additional components and/or may include a plurality of the depicted components.

In example implementations, the control console 102 and the light sources 106 may be part of an existing lighting system at a venue. In this regard, the light sources 106 may be in fixed locations within the venue and thus may not be easily repositioned. The control system 104 described herein may be advantageous in that it may be operational with an existing lighting system (e.g., existing lighting control console and light sources) and may be configured to create 3-D lighting arrangements without need to reposition the light sources. Other advantages are certainly possible.

Broadly speaking, the control console 102 may take the form of any electronic device that is configured to receive user inputs (e.g., from a lighting designer) and output control signals that control one or more special effects devices (e.g., the light sources 106, fog machines, hazers, etc.). Accordingly, the control console 102 may include one or more input interfaces, such as sliders, mechanical buttons, touch sensors, rockers, dials, or switches, among other examples. In some examples, the control console 102 may take the form of a lighting desk (also known as a lightboard, lighting board, or a lighting control console).

The control console 102 may also include one or more electrical outputs (e.g., channels) that may be configured to pass control signals to one or more special effects devices. In particular, the control console 102 may be configured to output control signals according to a given communication protocol, such as DMX 512, DMX-512-A, Remote Device Management (RDM), or some other serial protocol used to transmit control signals to special effects devices. In an example where the control console 102 is configured according to the DMX protocol, the control console 102 may include one or more sets of 512 output channels, and one or more of these channels may be addressed to a particular special effects device.

Accordingly, the control console 102 may be configured to output signals that control various aspects of one or more special effects devices. That is, the control console 102 may be configured with multiple channels and each channel may control a special effect or aspects thereof. For example, one channel may be configured to output pan signals, another may be configured to output tilt signals, and yet another may be configured to output special effects signals (e.g., gobo signals, color signals, light intensity signals, etc.) to a light source. Furthermore, the control console 102 may be configured such that the control signals passing through each channel may be adjusted with particular granularity. For example, each channel may include 256 steps. The control console 102 may pass such signals to a special effects device via a wired or wireless connection.

According to this disclosure, the control console 102 may be configured with multiple input interfaces and each input interface may represent a particular parameter of a geometric lighting arrangement. That is, each input interface may control or map to a channel that is associated with a particular parameter of a geometric. For example, the control console 102 may include a first input interface that may be used to select a primitive and multiple other input interfaces that may be used to modify aspects of the selected primitive. In some implementations, the control console 102 may include one or more input interfaces that may be used to modify a particular point(s) of a given primitive. Other examples are certainly possible.

Furthermore, the control console 102 may be configured with additional input interfaces that each represents a particular parameter of a given light source. For example, the control console 102 may include an input interface that may be used to assign a given light source to a particular point on a geometric and other input interfaces that may be used to control how the light source will illuminate that particular point. The control console 102 may include such input interfaces for each light source of the light sources 106. The aforementioned parameters, geometries, and primitives are discussed in further detail below.

The control system 104 may be configured to receive from the control console 102 signals that indicate one or more geometric and/or light-source parameters via a wired or wireless connection. The control system 104 may also be configured to receive from the GUI 108 signals that indicate one or more system parameters related to the light sources 106. Such system parameters may include (a) a number of light sources within a volume of the venue and their respective control console address spaces, (b) locations of the light sources in the volume, (c) orientations of the light sources (e.g., the direction in which the light source is currently pointed towards), (d) manufacturer/model of each light source, (e) a global scaling parameter (e.g., a parameter used to define the range that a primitive may be scaled), (f) a system origin parameter, and/or (g) other system parameters.

Accordingly, the control system 104 may include multiple electrical inputs (e.g., input channels), each of which may be configured according to a given communication protocol, to receive signals that indicate these parameters. Furthermore, the control system 104 may be configured to determine a parameter based on the input channel(s) on which the control system 104 received the signal(s). For example, the control system 104 may translate a signal received on a given input channel to a particular geometric parameter.

The control system 104 may also be configured to determine control parameters for each light source based on the received geometric, light source, and system parameters. Furthermore, the control system 104 may include multiple electrical outputs (e.g., channels) and one or more of the electrical outputs may be assigned to each respective light source.

Additionally, in some examples, the control system 104 may be configured to automatically determine one or more of the input parameters. For example, the control system 104 may be configured to automatically calibrate the lights sources 106. That is, the control system 104 may be configured to determine the position and/or orientation of the light sources 106 relative to a known world location within a volume. Calibrating light sources is discussed in further detail below.

To perform the functions described herein, the control system 104 may include a processing unit and data storage. The processing unit may include one or more general purpose processors and/or one or more special purpose processors and may be integrated in whole or in part with one or more of the electrical inputs. The data storage may include a non-transitory computer-readable medium, such as optical, magnetic, or flash memory, and may be integrated in whole or in part with the processing unit. The data storage may then include program instructions that executable by the processing unit to carry out various functions described herein. All of the elements of the control system 104 may be communicatively linked together by a system bus, network, or other connection mechanism.

What is more, the control system 104 may be configured to pass light control signals (e.g., tilt and/or pan signals) to the light sources 106. In some examples, the control system 104 may be configured to output the control signals according to a given communication protocol, such as DMX 512.

The light sources 106 may be any of a number of different types of movable light sources with at least one degree of freedom. In some examples, one or more light sources could be head light fixtures, such as head light fixtures with two degrees of freedom. Such lighting fixtures may be mounted on one or more motors that allow the fixtures to pan (horizontal swing) and tilt (vertical swing), independently or at the same time. In other examples, one or more light sources 106 could be moving mirror type fixtures where the fixture itself does not move but a mirror moves instead in order to direct light beams. In additional examples, one or more of the light sources 106 could be laser projectors capable of projecting laser light beams. In further examples, one or more of the light sources 106 may be capable of projecting light beams with varying colors, beam widths, patterns, shapes, and/or frequencies. Additionally, one or more of the lights sources 106 could be mounted on the ceiling, on the walls, on a stand positioned on the floor, or elsewhere within the venue.

In example implementations, as noted above, the light sources 106 may be configured to receive control signals that are transmitted according to a particular communication protocol. The light sources 106 may then translate the received control signals into internal signals that may be used to control internal motors. In other examples, the control system 104 may interface directly with motors controlling the light sources 106 via a motor controller or another digital-to-analog converter. Additionally, the control system 104 may be connected to the light sources 106 and/or other special effects components via a wireless network or a different local-area network. In further examples, Ethernet cabling may be used to transfer data to and/or from the light sources 106 as well or instead. Control may also come from other computing systems and/or may be distributed across multiple computing systems as well.

In addition to passing control signals to the light sources 106, the control system 104 may send to the GUI 108 visualization data related to the various parameters that the control system 104 received from the control console 102. Accordingly, the GUI 108 may be configured to cause a graphical display to display a representation of the visualization data. For example, the graphical display may display a visualization that represents a primitive, a primitive being modified, and/or a resulting geometric. Furthermore, as noted above, the GUI 108 may be configured to send one or more system parameters to the control system 104. Accordingly, the GUI 108 may include one or more input interfaces that are configured to receive inputs from a lighting designer.

In example implementations, the GUI 108 may be configured such that a lighting designer may use touch-inputs to transform a geometric in real-time or approximately real-time. For example, the GUI 108 may include a touch-sensitive display and may be configured to allow a lighting designer to interact with a geometric shown on the display. In particular, a lighting designer may be able to use touch-inputs to rotate, translate, and/or scale the displayed geometric. In turn, the GUI 108 may be configured to output signals to the control system 104 in response to such interactions.

Figure 1B:
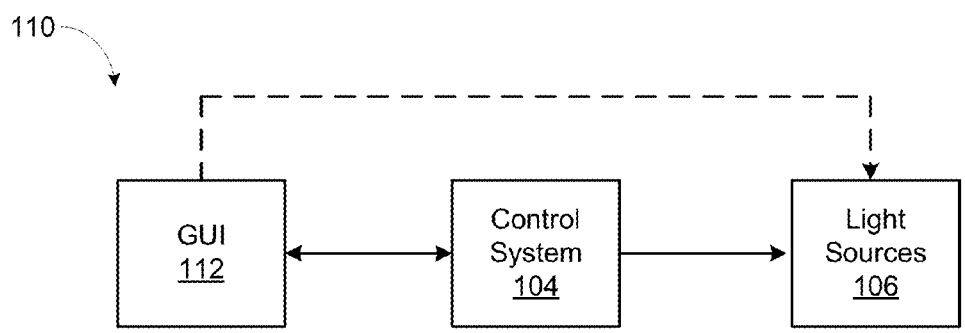
FIG. 1B illustrates a block diagram of a lighting system, according to another example embodiment.

Turning now to FIG. 1B, there is shown a block diagram of a lighting system 110, according to an example embodiment. Similar to the lighting system 100, aspects of the lighting system 110 may be arranged on or about a stage that is located within a space, such as a performance venue. For instance, the light sources 106 may be in fixed locations within the venue such that changing the respective physical location of each of the light sources 106 may be burdensome.

As shown, the lighting system 110 includes a GUI 112, the control system 104, and the light sources 106. These components may be electrically connected as shown in the figure. It should be understood that the lighting system 110 may include additional components and/or may include a plurality of the depicted components.

In at least some respects, the lighting system 110 may operate in a similar manner as the lighting system 100. In particular, the GUI 112 may be configured to perform some or all of the functions of both the control console 102 and the GUI 108 that were discussed above. In particular, the GUI 112 may include a software program that is configured to perform the same or similar functions as the control console 102. In example implementations, the GUI 112 may be configured to cause a graphical display to display a representation of the mechanical input interfaces as provided on the control console 102. These as well as additional functions will be discussed in further detail below.

III. Example Methods for Controlling 3-D Lighting Arrangements

Figure 2:
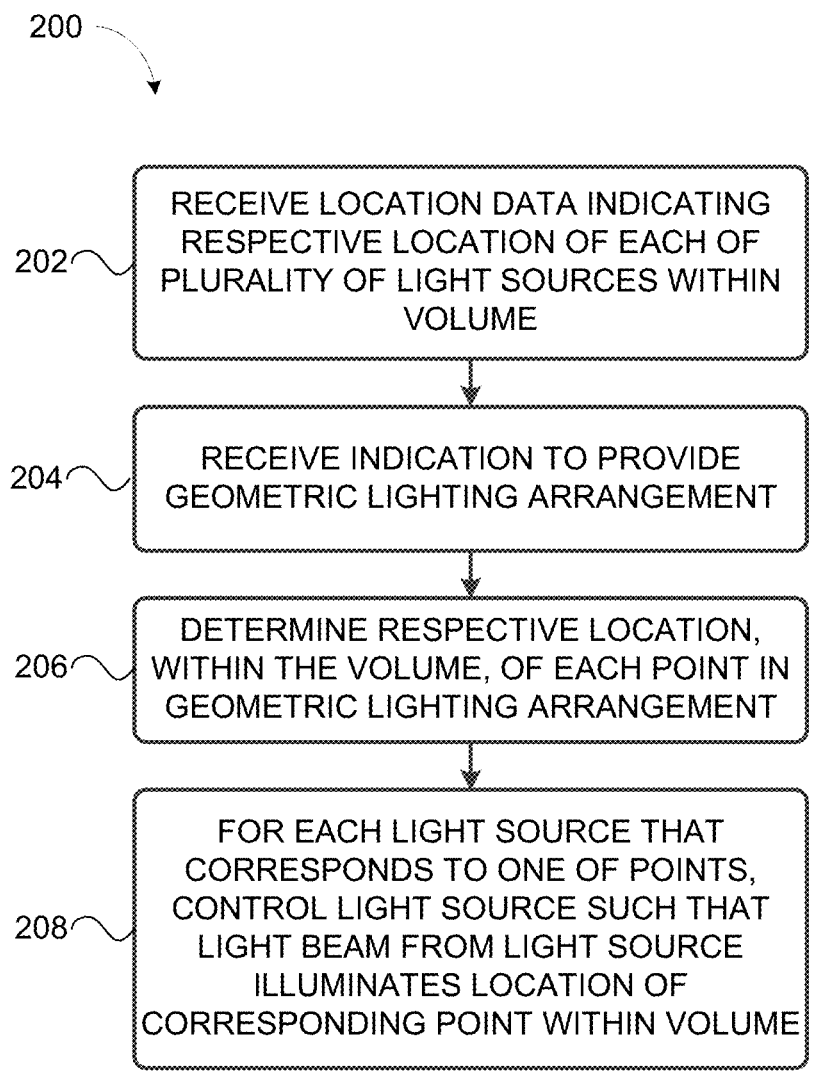
FIG. 2 illustrates a flowchart of a method, according to an example embodiment.

As discussed above, the control system 104 may be used for controlling 3-D lighting arrangements. FIG. 2 is a flowchart that depicts an example method 200 of such control. The method 200 may be performed in whole or in part by a lighting control system, such as the control system 104. The method 200 or portions thereof may be carried out by other computing systems as well.

For purposes of example and explanation only, the method 200 is described herein with reference to the lighting system 100 of FIG. 1A. It should be understood that the method 200 may be carried out on other systems as well. Furthermore, the method 200 is described herein with reference to FIGS. 3A-3D that illustrate example displays provided by a GUI and FIGS. 4A-4C that show example illustrations of light sources projecting respective light beams to create a 3-D lighting arrangement. It should be understood, however, that this is for purposes of example and explanation only and that various other examples are certainly possible.

Furthermore, those skilled in the art will understand that the flowcharts described herein depict functionality and operation of certain implementations of example embodiments. In this regard, each block of each flowchart may represent a module, a segment, or a portion of program code, which includes one or more instructions executable by a processor for implementing specific logical functions or steps in the process. The program code may be stored on any type of computer-readable medium, e.g., such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

The method 200 may begin at block 202 with receiving by a computing system location data indicating a respective location of each of a plurality of light sources within a volume. At block 204, the method 200 may involve receiving by the computing system an indication to provide a geometric lighting arrangement, where the geometric lighting arrangement includes a plurality of points having a pre-determined spatial relationship. At block 206, the method 200 may involve determining by the computing system a respective location, within the volume, of each point in the geometric lighting arrangement, where at least one of the light sources corresponds to each point. At block 208, the method may involve, for each light source that corresponds to one of the points, controlling by the computing system the light source such that a light beam from the light source illuminates the location of the corresponding point within the volume. Each block of FIG. 2 is discussed in further detail below.

1. Receiving Location Data

The method 200 may begin at block 202 with receiving by a computing system location data indicating a respective location of each of a plurality of light sources within a volume. This function may be performed in a number of ways.

In some examples, the control system 104 may receive the location data from the GUI 108. For instance, a lighting designer may provide at the GUI 108 inputs that indicate at least a location for each of the light sources 106 within a volume. In other examples, the control system 104 may receive the location data from the control console 102. In yet other examples, the control system 104 may determine locations for each light source within the volume using a calibration process, which is discussed in detail below.

A volume may be a three-dimensional space used for a light show. In example implementations, the volume may be within a venue and may occupy all or a portion of the venue. For example, the volume may be the three-dimensional space above a stage or a venue floor. A world frame within the volume may be identified to determine the respective location of each of the light sources 106. Herein, the world frame should be understood to be a coordinate axes positioned somewhere within the volume (e.g., with an origin at a corner or center of the stage or some other known point in the volume). In example implementations, the control system 104 may receive from the GUI 108 data indicating the position of the world frame. For instance, the lighting designer may input a system origin parameter that may be used by the control system 104 as the origin of the world frame.

In any event, the location data for each light source may include a set of 3-D coordinates that correspond to a location of the light source within the volume. In particular, the location data for a given light source may include (x, y, z) values relative to the world frame. In practice, the location of a given light source may include a z-component indicating a vertical offset built into the light source itself and/or a height of an aspect of the environment that the light source may be mounted on, such as the ceiling of the venue or a mechanical device situated on the stage, for example. In other examples, the location of a given light source may only include x- and y-components indicating that the light source is positioned on the same horizontal plane as the world frame. For example, the light source may be positioned directly on the floor of the stage.

Further, the control system 104 may also receive orientation data indicating a respective orientation of each of the plurality of light sources within the volume. That is, the orientation data of a light source may indicate the current direction that the light source is pointed towards. This function may be performed using one or more of the operations discussed above with respect to the location data. For example, the control system 104 may receive the orientation data from inputs provided by a lighting designer or the control system 104 may use an automatic process, such as the calibration process, to determine such data. Other examples are certainly possible.

Additionally, the control system 104 may also receive other data indicating system parameters. For example, the control system 104 may receive from the GUI 108 input signals that indicate (a) a specific number of light sources within the volume and their respective control console address spaces, (b) manufacturer/model information of each light source, (c) a global scaling parameter, and (d) the system origin parameter as discussed above. The control system 104 may receive other system parameters as well.

2. Receiving Indication to Provide Geometric Lighting Arrangement

At block 204, the method 200 may involve receiving by the computing system an indication to provide a geometric lighting arrangement, where the geometric lighting arrangement includes a plurality of points having a pre-determined spatial relationship. In example implementations, the control system 104 may receive such an indication from the control console 102 or perhaps from the GUI 112 of FIG. 1B.

In practice, receiving the indication to provide the geometric lighting arrangement may involve the control system 104 receiving signals that indicate a set of geometric parameters and a set of light-source parameters. That is, the control system 104 may receive signals on one or more input channels that map to a particular geometric parameter. The geometric parameters may define a geometric that some or all of the light sources 106 are to illuminate. As noted above, a geometric is made up of a primitive that may be a set of points or vertices with a pre-determined spatial relationship to one another. In example implementations, the vertices or points in a particular primitive may define a particular shape. For example, a given primitive could define a rectangle, a triangle, or an ellipsoid, among other possibilities. Further, a spatial relationship between points in a primitive could be two-dimensional (e.g., such that the points are all on the same plane) or three-dimensional (e.g., points arranged along the edges of a cube or in another 3-D geometry).

The geometric parameters may include information that is used by the control system 104 to construct the desired geometric. For example, consider a scenario where the control system 104 stores in data storage 256 primitives, which may include a one-dimensional point, two-dimensional shapes (square, triangle, circle, etc.), and three-dimensional shapes or forms (cube, sphere, torus, etc.). In such a scenario, the control system 104 may allow a lighting designer to use the control console 102 to define how a geometric should be formed in the volume by specifying a primitive parameter (which may be addressed from 0-255), as well as nine parameters for translation, rotation, and scale within the (z, y, z) coordinate system defining the volume. Accordingly, a set of geometric parameters defining a desired geometric may include:

| Primitive address | ry (y-axis rotation) |
| tx (x-axis translation) | rz (z-axis rotation) |
| ty (y-axis translation) | sx (x-axis scaling) |
| tz (z-axis translation) | sy (y-axis scaling) |
| rx (x-axis rotation) | sz (z-axis scaling) |

The translation parameters may define a movement of the primitive where every point of the primitive moves the same distance and in the same direction so as to maintain the pre-determined spatial relationship. The rotation parameters may define a movement of the primitive about one or more of the x-, y-, and z-axes and such movement may involve maintaining the pre-determined spatial relationship of each point. The scale parameters may define an expansion or a contraction of the primitive within a given plane. That is, such parameters may be used to define the size of the primitive. In this regard, the scale parameters may be used to modify the spatial relationship of the points of the primitive. In example implementations, a global scaling parameter may define the range that a primitive may be scaled. For example, the scale on a primitive may be the input scale parameter(s) multiplied by the global scaling parameter. For instance, a one or two step scale may translate to a scaling of multiple inches, feet, meters, etc. in the world frame. Other examples are also possible.

In certain implementations, the geometric parameters may include information specific to each particular point of a given geometric. For example, the geometric parameters may include one or more (x, y, z) translation parameters for a given point of a primitive that may indicate that the given point should be translated while the other points of the primitive remain stationary. Further, the geometric parameters may indicate a characteristic of the light beam that will be used to illuminate a point of the geometric. For example, such characteristics may include the beam width, color, intensity, and/or frequency of the light beam, among other examples.

In example implementations, after the control system 104 receives the set of geometric parameters, the control system 104 may generate a rendering of the geometric based on the received signals. Such a rendering may involve the control system 104 translating the received signals into 3-D coordinates (discussed in further detail below). The control system 104 may then transmit to the GUI 108 visualization data indicating a visualization of such a rendering. The GUI 108 may in turn cause a graphical display to display a representation of the visualization data. In this way, a lighting designer may be able to visualize, in approximately real-time, the geometric as he or she interacts with the input interfaces on the control console 102. Further, the control system 104 may store the received geometric parameters and/or the visualization data in data storage for later use by the lighting designer.

Figure 3A:
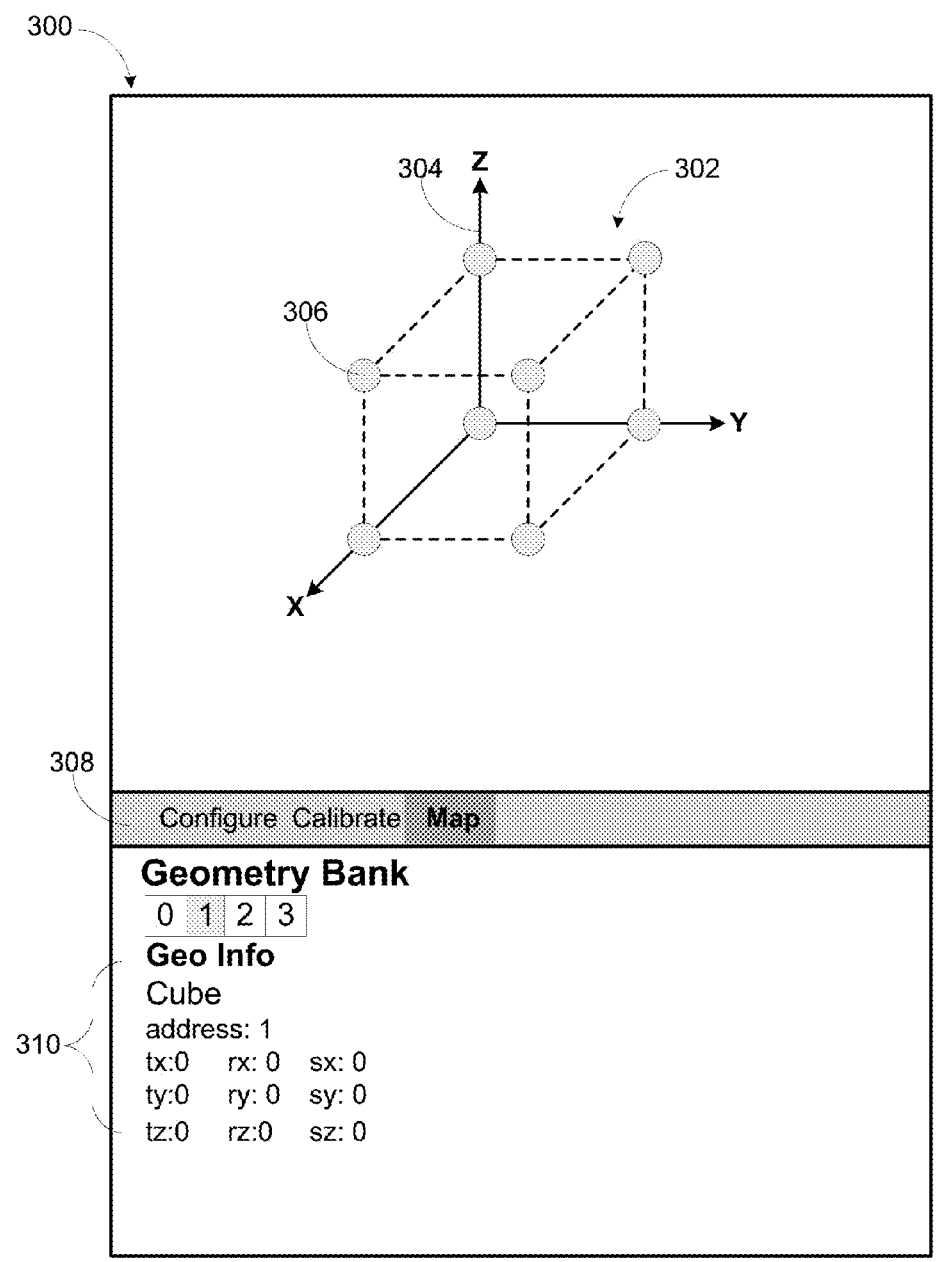
FIGS. 3A-3D each illustrates an example display provided by a graphical display, according to example embodiments.

To illustrate, FIG. 3A illustrates an example display 300 that may be output by the GUI 108 after receiving visualization data from the control system 104. As shown, the display 300 includes a visualization of a geometric 302. The visualization includes the geometric 302 (e.g., a cube, as shown by the dotted lines), which is made up of multiple points 306, and coordinate axes 304 that corresponds to the world frame. The display 300 may also include a display control bar 308 that may be used to navigate to different display windows and an information bank that includes information, such as geometric information 310 that corresponds to the geometric parameters that define the displayed geometric 302. As shown, the geometric 302 corresponds to a cube primitive because the lighting designer has not modified the primitive as shown by the geometric information 310.

Figure 3B:
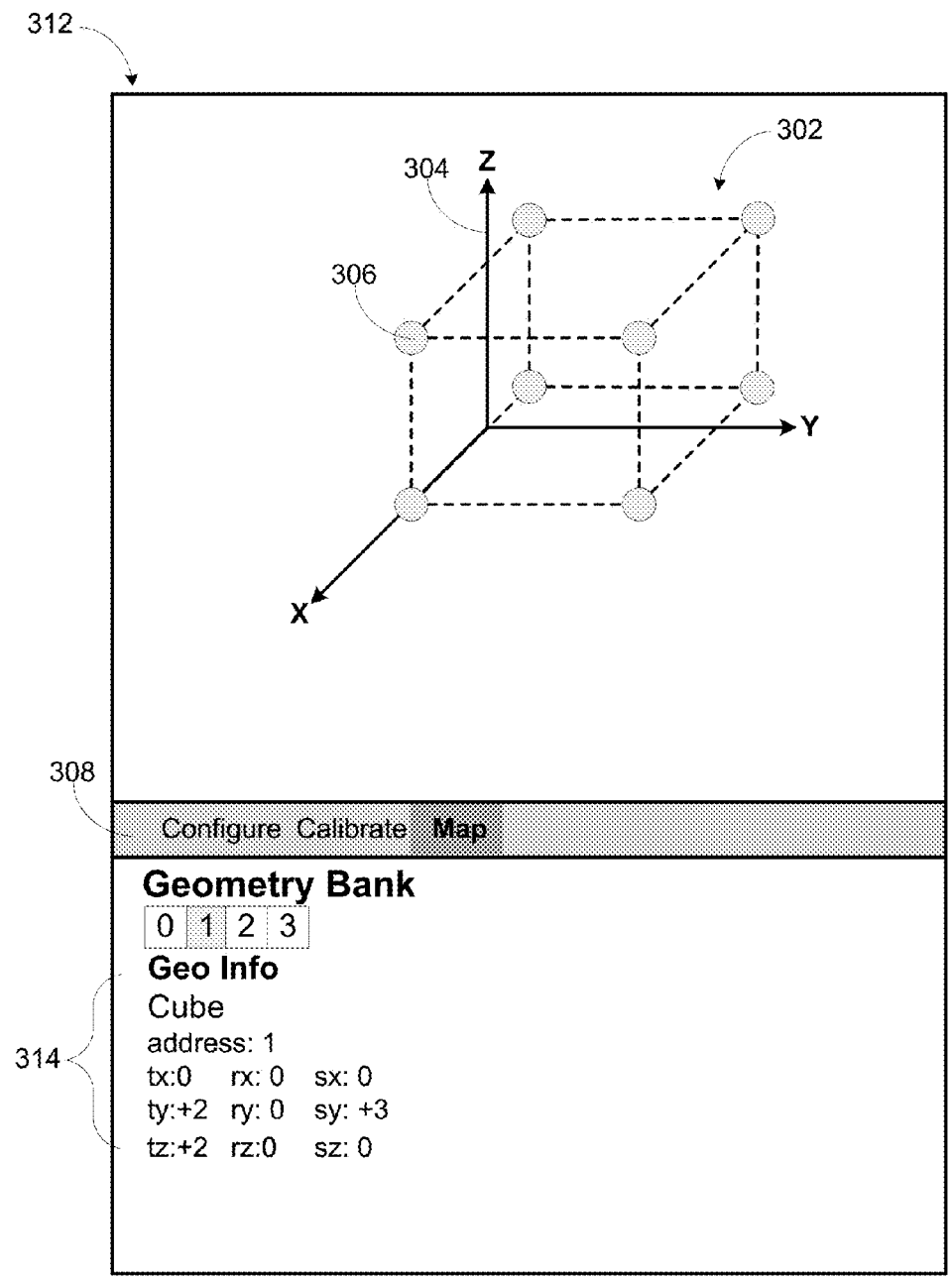

FIG. 3B illustrates another example display 312. The display 312 is similar in some respects to the display 300, but the geometric 302 has been modified. As shown, the geometric 302 has been translated in the both the y- and z-directions (e.g., the geometric has been moved vertical and to the right), and the geometric has been scaled in the y-direction (e.g., the geometric has been expanded to the right). Notably, geometric information 314 reflects the y-z-axis translation and y-axis scaling.

Figure 3C:
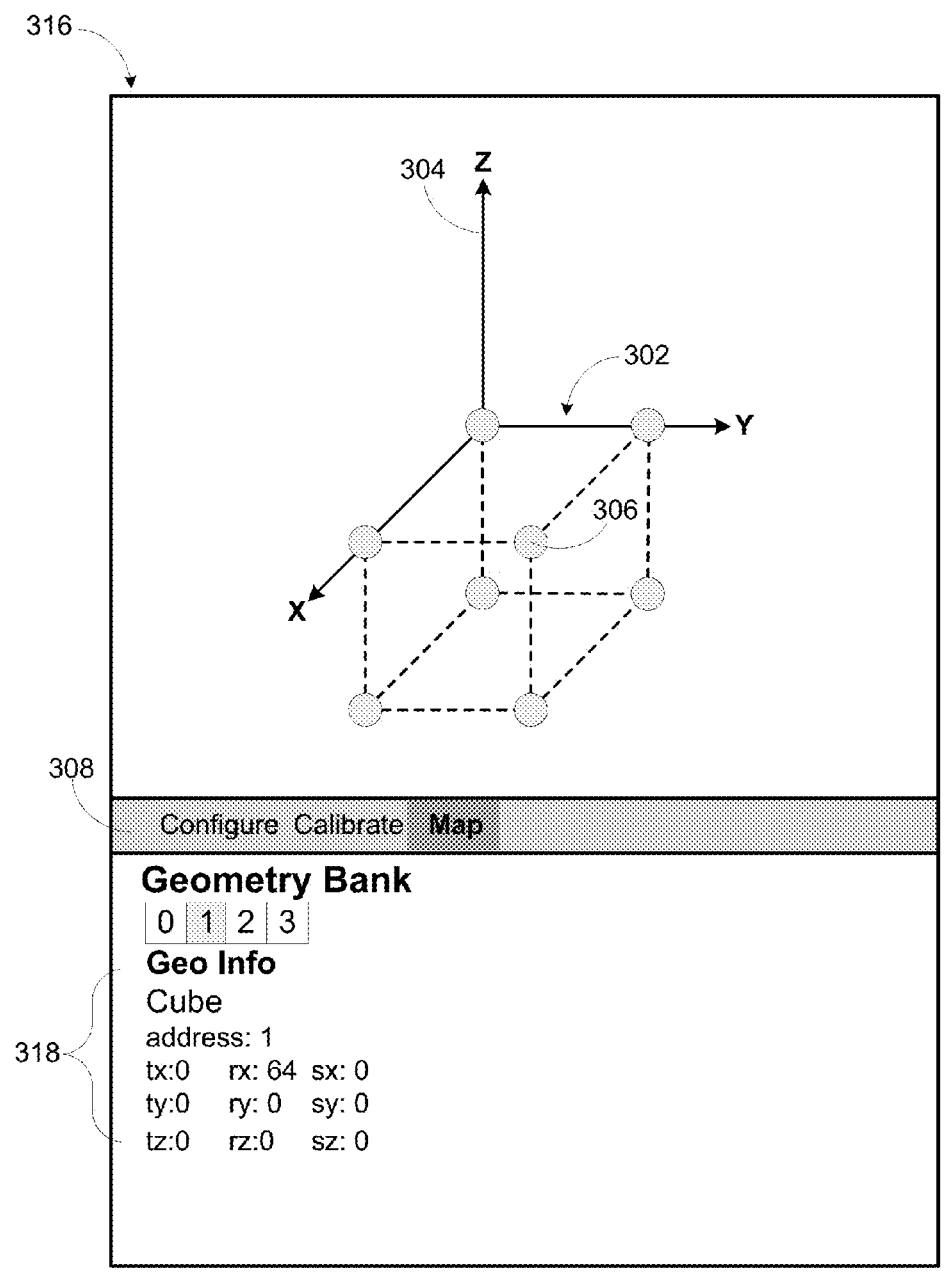

FIG. 3C illustrates yet another example display 316. The display is similar to the display 300, but the geometric 302 has been modified. As shown, the geometric 302 has been rotated relative to the x-axis (e.g., the geometric 302 has been rotated clockwise by 90 degrees). Notably, geometric information 318 reflects the x-axis rotation (e.g., 64 may represent the number of steps out of 256 that correspond to a 90-degree rotation).

As noted above, receiving the indication to provide the geometric lighting arrangement may involve the control system 104 receiving signals that indicate not only the set of geometric parameters but also a set of light-source parameters. The light-source parameters may define how the control system 104 will control the light sources 106 to illuminate the geometric defined by the geometric parameters. In particular, the light-source parameters may define the role of some or all of the light sources 106 in illuminating the geometric.

For example, the control system 104 may allow a lighting designer to use the control console 102 to map a particular light source to a particular point in a geometric. This mapping may involve the lighting designer specifying the address of a geometric ("geo mapping"). That is, designed geometrics may be stored by the control system 104 and assigned to a particular address, which a lighting designer may access. Mapping may also involve the lighting designer specifying an integer address of a vertex (or point) on the geometric ("vertex mapping"). In addition, the mapping may also involve the lighting designer specifying one or more parameters to describe a translational offset from a vertex in the (x, y, z) coordinate system defining the volume. Further, the mapping may involve specifying how long it takes to interpolate between changing values for the geo mapping ("geo time") (e.g., the time it takes to interpolate between a previously mapped geometric and a currently mapped geometric) and changing values for the vertex mapping ("vertex time") (e.g., the time it takes to interpolate between a previously mapped vertex and a currently mapped vertex). Accordingly, the set of light-source parameters may include a parameter set for each light source of the light sources 106. Each such set may include:

| | |
|---|---|
| Geo mapping | x-axis offset |
| Geo time | y-axis offset |
| Vertex mapping | z-axis offset |
| Vertex time | |

In example implementations, after the control system 104 receives the set of light-source parameters, the control system 104 may generate a visualization of the mapping of the lights sources based on the light-source parameters. The control system 104 may then transmit to the GUI 108 visualization data indicating a visualization of the mapping. The GUI 108 may then cause a graphical display to display a representation of the visualization data. In this way, a lighting designer may be able to visualize, in approximately real-time, the mapping of the light sources to points on the geometric as he or she interacts with the input interfaces on the control console 102. Further, the control system 104 may store the received set of light-source parameters and/or the visualization data in data storage for later use by the lighting designer.

Figure 3D:
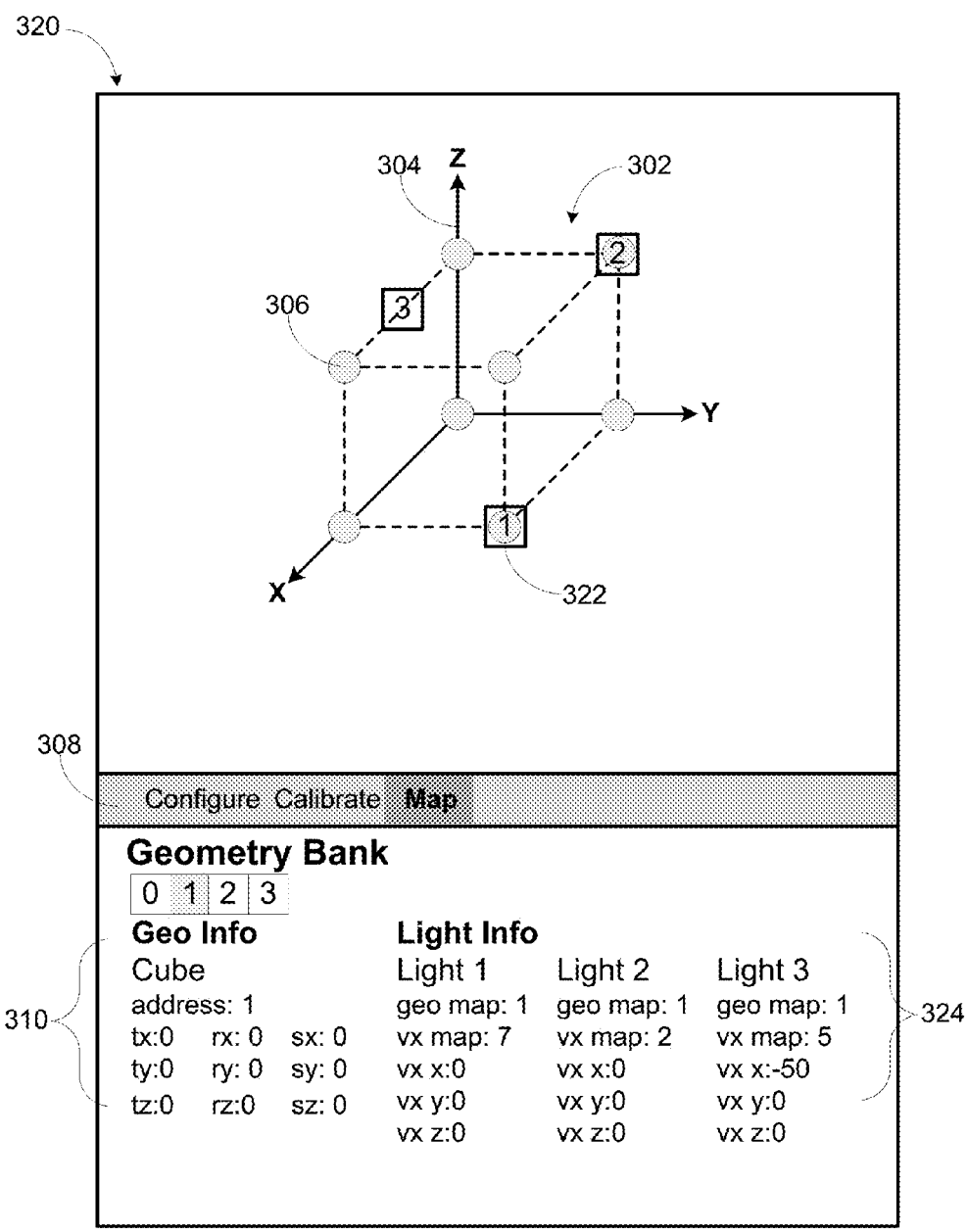

To illustrate, FIG. 3D shows an example display 320 that may be output by the GUI 108 after receiving visualization data from the control system 104. The display 320 is similar in some respects to the display 300 of FIG. 3A, but the display 320 includes additional information. As shown, the visualization now includes, in addition to the geometric 302, multiple light-mapping indicators 322 that indicate where on the geometric 302 a respective light source will be directed to aim its light beam through. Furthermore, the information bank of the display 320 also includes light-source information 324 that corresponds to aspects of the received light-source parameters.

As shown, the light-source information 324 identifies that there are three light sources mapped to various points of the geometric 302. In particular, the light source information 324 identifies the vertex that a given light source is assigned to and a (x, y, z) vertex offset, if any, that identifies a point, offset from the assigned vertex, at which the light source will be directed to aim its light beam through.

Each vertex of the geometric may be assigned an integer address and such assignment may be performed in a number of ways. In the present example, each of the points 306 may correspond to a respective vertex and each point 306 may be assigned an integer address. For example, the point at the origin of the coordinate axes 304 may be assigned integer address 0 and rotating clockwise from that point at the origin, the points in the y-z plane defined by the y- and z-axes may be assigned 1, 2, and 3, respectively. Similarly, starting from the other point on the x-axis and rotating clockwise, the points may be assigned integer addresses of 4, 5, 6, and 7, respectively. Accordingly, the light source information 324 identifies that light source 1 is mapped to vertex 7, that light source 2 is mapped to vertex 2, and that light source 3 is mapped to a location offset in the negative-x direction from vertex 5.

It should be understood that additional light sources may also be mapped to the geometric and the display 320 may reflect such additional mappings. In example implementations, at least one light source may be mapped to each point in the geometric. It should also be understood that, in practice, the displays 300, 312, and 316 may include the additional information as shown in the display 320, but for sake of clarity, such information was omitted from FIGS. 3A-3C.

3. Determining a Respective Location, within the Volume, of Each Point in the Geometric Lighting Arrangement Returning back to FIG. 2, at block 206, the method 200 may involve determining by the computing system a respective location, within the volume, of each point in the geometric lighting arrangement, where at least one of the light sources corresponds to each point. The determined location of each point may be defined by a set of (x, y, z) coordinates within the volume.

The control system 104 may make such a determination based at least on the received location data and the received sets of geometric and light-source parameters. In some examples, such a determination may be based on other information as well, such as a known value and/or other received parameter (e.g., a system origin and/or global scaling parameter).

In practice, the control system 104 may first determine a particular position (e.g., (x, y, z) coordinates) of the geometric within the volume. For example, the particular position may be determined such that the geometric is placed at the center of the stage and perhaps suspended above the stage. In some examples, the particular position may correspond to the origin of the real world frame. After determining the particular position of the geometric within the volume, the control system 104 may then determine a location (e.g., 3-D (x, y, z) coordinates) of each point of the geometric.

In example implementations, determining the respective location, within the volume, of each point in the geometric may involve the control system 104 translating the received information into coordinates that may be mapped to the world frame. For instance, in some implementations, the control system 104 may have received information from the control console 102 according to a given communication protocol, such as DMX 512. Accordingly, the control system 104 may translate the received DMX values, which typically represent 2-D values, into 3-D coordinates relative to the world frame. In this way, the control system 104 may then determine a respective location, within the volume, of each point in the geometric at which light source(s) will be aimed to illuminate with a light beam(s).

4. Controlling Each Light Source

At block 208, the method 200 may involve, for each light source that corresponds to one of the points, controlling by the computing system the light source such that a light beam from the light source illuminates the location of the corresponding point within the volume. This function may involve the control system 104 using the determined coordinates of a given point to determine pan and tilt parameters that would position the corresponding light source to emit a light beam towards the determined coordinates.

For example, the control system 104 may use the coordinates of a given point and the coordinates of the light source mapped to the given point to determine pan and tilt parameters. In particular, the control system 104 may start from the location of the given point and extrapolate an imaginary line to the location of the light source mapped to the given point. The control system 104 may then determine pan and tilt values that would align a light beam from the light source with the imaginary line. Other examples of translating point locations into control values are also possible. In any event, the control system 104 may then generate pan and tilt signals according to a given communication protocol, such as DMX 512.

After the control system 104 determines the appropriate pan and tilt values for each light source that is mapped to a point on the geometric, the control system 106 may then transmit pan and tilt signals to control each light source such that a light beam from the light source illuminates the location of the corresponding point within the volume. In practice, the control system 104 may include an output channel assigned to each light source and each respective channel may be used to transmit control signals to each corresponding light source. In response to receiving such signals, the respective lights sources may then transmit a light beam through the location of the corresponding point within the volume.

Figure 4A:
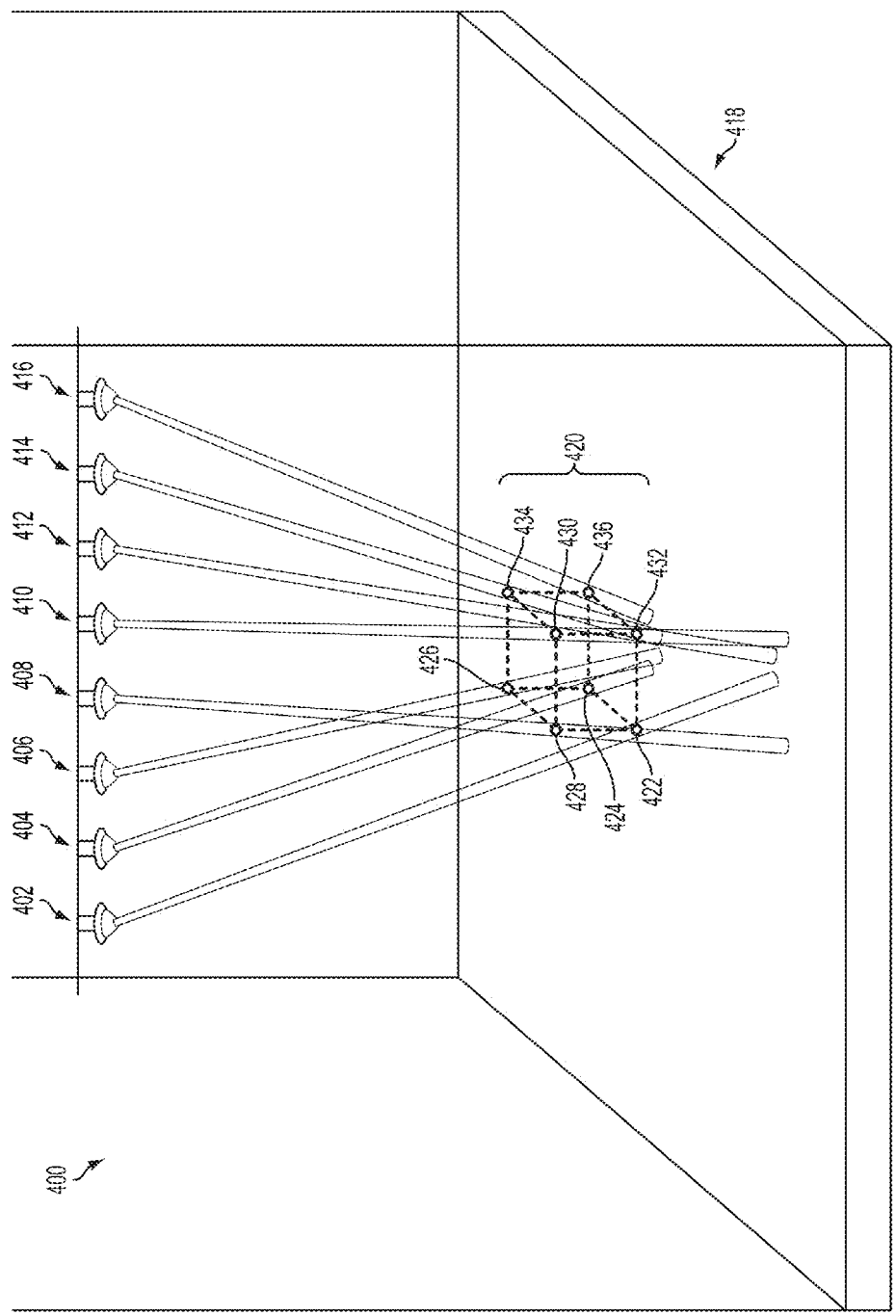

To illustrate, FIG. 4A shows an example illustration of light sources projecting respective light beams to create a 3-D lighting arrangement. As shown, a venue 400 includes a set of light sources 402-416, for example, mounted on the ceiling of the venue, and a stage 418. The light sources 402-416 each project a respective light beam to create a geometric 420 (e.g., a cube) (it should be understood that the points and dotted lines would not be visible in the venue 400 but are shown for purpose of explanation). In particular, the geometric 420 is shown in the center of the stage 418 and suspended in the air above the stage 418. The geometric 420 includes multiple points 422-436, and each respective light source 402-416 is shown projecting a light beam through one of the points 422-436. For example, the light source 402 is projecting a light beam through the point 422, the light source 404 is projecting a light beam through the point 424, and so on. Notably, the geometric 420 is suspended above the stage 418 such that the light beams pass through the points 422-436 before hitting the stage 418. It should be understood that FIG. 4A is but one example of multiple light sources projecting light beams through a geometric and should not be construed as limiting. For example, the light sources may be arranged in other ways, the venue may include additional aspects, a different geometric may be illuminated, and so forth.

5. Additional Functions

Additional functions may be carried out with or in addition to method 200. In practice, after a lighting designer specifies a particular geometric and the control system 104 causes the light sources 106 to illuminate the geometric, the lighting designer may wish to transform the illuminated geometric, for example, as part of a light show. Accordingly, additional functions may involve the control system 104 receiving an indication of a particular transformation and then determining, for each point in the geometric, an associated sequence of locations within the volume that correspond to the particular transformation.

For example, a lighting designer may interact with one or more input interfaces at the control console 102, or perhaps the lighting designer may interact with a displayed geometric on the GUI 108. Such interactions may indicate that the lighting designer would like to move, rotate, and/or scale the illuminated geometric, or perhaps that the lighting designer would like to cause the light sources to illuminate a different geometric. In any event, the control system 104 may receive signals from the control console 102 (or the GUI 108) indicating the desired transformation.

After receiving the indication of the particular transformation, determining the associated sequence of locations within the volume that correspond to the particular transformation may involve the control system 104 first determining one or more parameters of the particular transformation. For example, the one or more parameters may include one or more of: (a) x-axis translation ($t_x$), (b) y-axis translation ($t_y$), (c) z-axis translation ($t_z$), (d) x-axis rotation ($r_x$), (e) y-axis rotation ($r_y$), (f) z-axis rotation ($r_z$), (g) x-axis scaling ($s_x$), (h) y-axis scaling ($s_y$), and (i) z-axis scaling ($s_z$). In some examples, the control system 104 may determine the one or more parameters based on the input channel(s) on which the control system 104 received the signal(s) indicating the transformation. For example, the control system 104 may translate a signal on a given input channel to a particular transformation parameter.

The control system 104 may then determine, for reach point in the geometric, a sequence of (x, y, z) coordinates relative to the world frame that correspond to the particular transformation. Similar to the above discussion with respect to block 208 of FIG. 2, the control system 104 may use the determined sequence of coordinates to determine a sequence of pan and tilt parameters that would position the corresponding light source to emit a light beam according to the particular transformation.

Accordingly, an additional function may involve the control system 104 controlling the light sources such that the respective light beam from each light source moves through the associated sequence of locations within the volume, thereby providing the particular transformation. For example, the control system 104 may transmit respective pan and tilt signals to each respective light source according to the determined sequences of pan and tilt parameters.

To illustrate, FIG. 4B shows an example illustration of light sources projecting respective light beams to create a 3-D lighting arrangement. In particular, FIG. 4B shows the light sources 402-416 projecting light beams after the geometric 420 from FIG. 4A has been moved according to a particular transformation. In FIG. 4B, the geometric 420 is shown with a 180-degree z-axis rotation and a negative 30-degree y-axis rotation relative to the geometric 420 of FIG. 4A. Notably, each of the lights 402-416 is shown passing a light beam through the same point as in FIG. 4A. For example, the light source 402 is projecting a light beam through the point 422 but at the new location of the point 422. The other lights sources are depicted as doing the same. It should be understood that as the control system 104 controls the lights sources 402-416 with the sequence of pan and tilt signals according to a given transformation, a user might visualize a continuous movement of light beams.

Figure 4C:
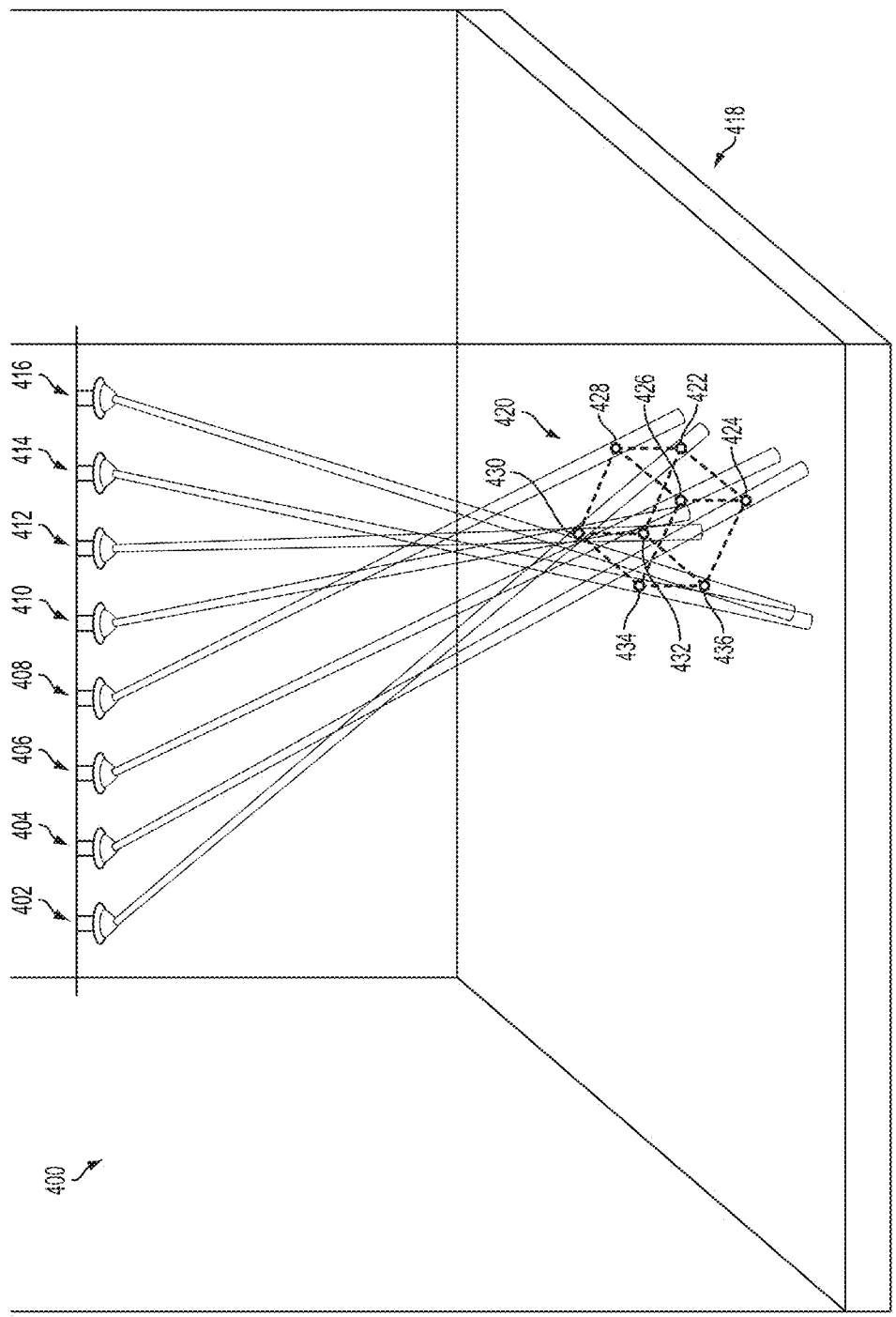

FIG. 4C shows another example illustration of light sources projecting respective light beams to create a 3-D lighting arrangement. In particular, FIG. 4C shows the light sources 402-416 projecting light beams after the geometric 420 from FIG. 4B has been moved according to a particular transformation. In FIG. 4C, the geometric 420 is shown with a positive y-axis translation and a negative z-axis translation relative to the geometric 420 of FIG. 4B (e.g., the geometric 420 has been shifted right and lowered toward the stage). Notably, each of the lights 402-416 is mapped to the same point as in FIGS. 4A and 4B. It should be understood that FIGS. 4B and 4C are but two example illustrations of transformations of a geometric and that many other examples are possible.

In example implementations, an additional function may involve transforming the geometric based on the movement of a real-world object (such as a person, a person's finger, a motion tracking device, etc.). For example, the control system 104 may be configured to cause the light sources 106 to project a geometric around an actor on the stage in the venue. As the actor moves about the stage (e.g., jumps up, squats down, moves laterally, etc.), the control system 104 may be configured to detect such movements, convert the detected movements into one or more transformation parameters, and then control the light sources so that the geometric follows the actor as he or she moves, while substantially maintaining the position of the geometric on the actor. Similarly, the control system may be configured to transform a geometric based on the movement of an actor's body part. For example, an actor may move his or her finger and the geometric may move accordingly. Other examples are certainly possible.

The example systems and methods discussed above therefore may allow for generating and controlling three-dimensional lighting arrangements in an environment. Such systems and methods may be used during performance, such as a light show, to create dynamic, complex visualizations.

IV. Example Systems and Methods for Calibrating a Light Source

As noted above, in some examples, the control system 104 may be configured to automatically calibrate the light sources 106. In such an example, the control system 104 may communicate with photosensors, light sources, and/or other components on the stage, such as to command axis values of the light sources and/or receive sensor data from the photosensors. In some examples, the control system may maintain information about the environment (e.g., ambient light levels) in order to make the system robust to changes in the environment.

More specifically, calibrating a light source may initially involve the control system 104 determining a position of at least three photosensors relative to a world frame. The photosensors (or "photodetectors") may be any of a number of different types of sensors capable of detecting light and/or other electromagnetic energy. For example, the photosensors may include light-emitting diodes (LEDs), photodiodes, active pixel sensors, charge-coupled devices, light dependent resistors (LDRs), infrared sensors, optical detectors, and/or other types of sensors. In some examples, the photosensors may be capable of determining identifying properties of detected light beams as well, such as color or frequency. In further examples, the photosensors may be battery-powered or contain a different power source.

The positions of the photosensors may include (x, y, z) values relative to the world frame. In some examples, the positions of the photosensors may include a z-component indicating a vertical offset built into the photosensor itself and/or a height of an aspect of the environment that the photosensor may be mounted on, such as an elevated part of a stage, steps, device actors, or other mechanical components, for example. In other examples, all of the photosensors may be mounted directly on the floor, such that only x- and y-components may be used to indicate positions of the photosensors.

Furthermore, photosensors may be positioned at different places within a stage. In some examples, the photosensors may be spaced out around the stage with a certain amount of space between any two photosensors. In other examples, the photosensors may all be placed at the same elevation or they may be placed at different elevations. Additionally, the photosensors may be positioned such that any light source to be calibrated has an orientation that allows the light source to project a light beam that hits at least three of the photosensors.

The positions of the photosensors within an environment may be determined in a number of different ways. In one example, photosensors may be mounted on a pre-measured rigid frame. The dimensions of the frame may be predetermined so that the position of a given photosensor at a particular mounting point relative to the rigid frame can be easily determined. The rigid frame may then be positioned on a stage so that its position relative to a world reference frame on the stage may be easily determined (e.g., a corner of the rigid frame may be placed at a corner of the stage). In alternative examples, the world reference frame may be positioned relative to the location of the rigid frame on the stage (e.g., at a junction point of the rigid frame). In either case, the positions of the photosensors relative to the world frame may then be determined based on where they are mounted on the rigid frame. In some examples, many photosensors (e.g., hundreds or thousands) could be positioned on a single rigid frame or multiple rigid frames.

In another example, a laser tracker may be used to determine the positions of the photosensors. For instance, a laser tracker may project a laser beam at a photosensors. The laser beam may be reflected back to the laser tracker by either the photosensor or an optical target mounted on the photosensor. In order to determine the position of the photosensor, the laser tracker may then determine precise positions of one or more points on the photosensor based on when the laser beam is reflected back to the laser tracker. The laser tracker may be positioned on the stage at one or more points so that it has an unobstructed view of each of the photosensors in order to measure the positions of all of the photosensors on the stage.

In a further example, the positions of the photosensors may be determined using a position sensor that is included with each photosensor. A position sensor could be any device capable of enabling position measurement, such as a position transducer, a GPS sensor, a proximity sensor, or a displacement sensor. The position sensors could be either absolute position sensors or relative position sensors, and could be linear or angular sensors across one or more axes. Additionally, each position sensors may be capable of communicating position information to a remote computing system (e.g., the control system 104), such as through a wireless connection. The computing system may then use the position information to determine positions of the photosensors for use in calibrating lights on the stage. In some examples, local computing systems on the photosensors may perform processing steps on the position data locally as well or instead.

After determining the position of the photosensors, calibrating the light source may involve the control system 104 controlling an orientation of one of the light sources 106 to project a light beam across an area encompassing the photosensors.

Figure 5A:
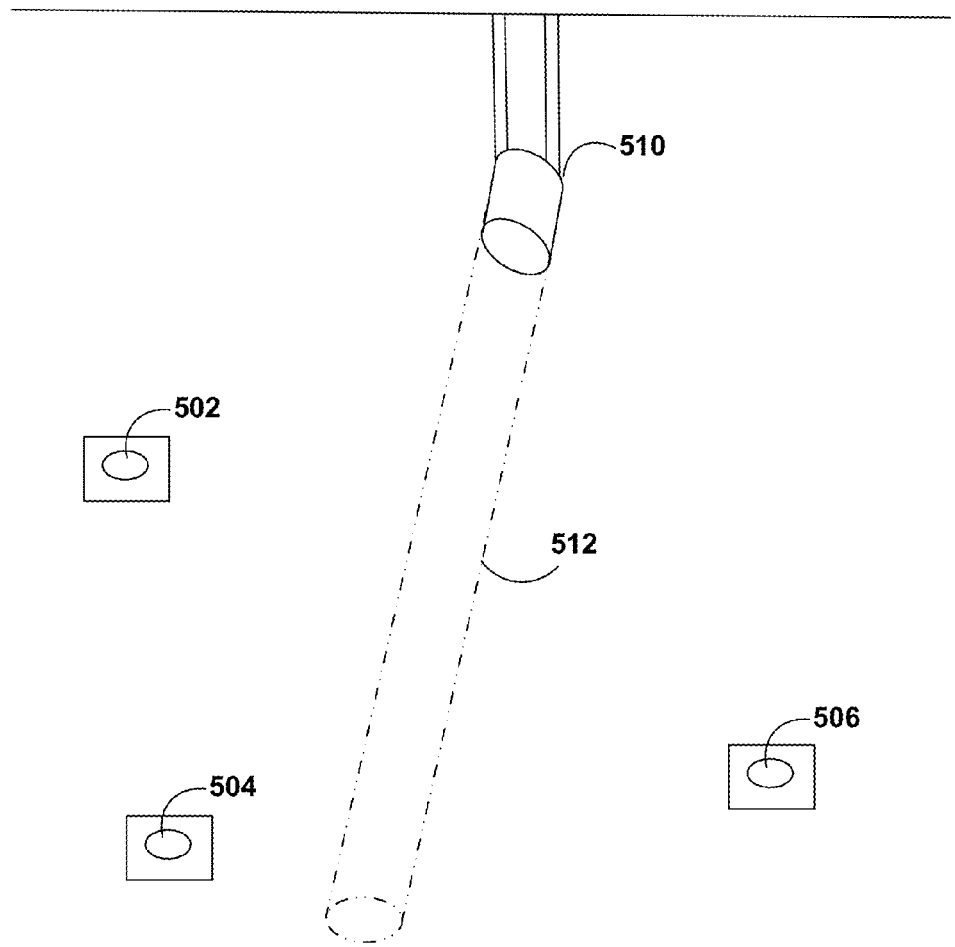
FIG. 5A illustrates a stage containing three photosensors and a light source projecting a light beam, according to an example embodiment.

FIG. 5A shows a configuration of a light source and photosensors, according to an example embodiment. More specifically, in the illustrated configuration, the light source 510 is projecting a light beam 512 across a stage containing three photosensors, 502 to 506. The light source 510 may project a light beam 512 onto a floor or other part of a stage. While the light source 510 continues to project the light beam 512, the control system 104 may then cause the light source 510 to project the light beam 512 onto other areas within the stage, for example, by changing the pan and/or tilt of the light source 510. The control system 104 may cause the light source 510 to project the light beam 512 around the stage in any number of different ways. For instance, the pan and/or tilt of the light source 510 may be adjusted in a systematic way to cover sections of the stage (e.g., in rows or in columns or particular zigzags across the stage). Other example scanning patterns may include concentric arcs, a spiral, or a star pattern. In other examples, the orientation of the light source 510 may be modified in random or semi-random ways as well in order to project the light beam 512 in different directions within the stage. The scanning area may also be constrained to some subsection of the full envelope of some or all of the light source.

Calibrating the light source may also involve the control system 104 receiving a signal when a photosensor has sensed a light beam. The signal may be sent to the control system through a wireless connection or a different type of connection, for example. In some examples, the photosensors may be connected together in a mesh network so that signals can be transmitted from one photosensor to the next in sequence. Such examples may be used in situations where a large number of photosensors are placed on a stage in order to quickly transmit data from many photosensors to a control system, for example.

Figure 5B:
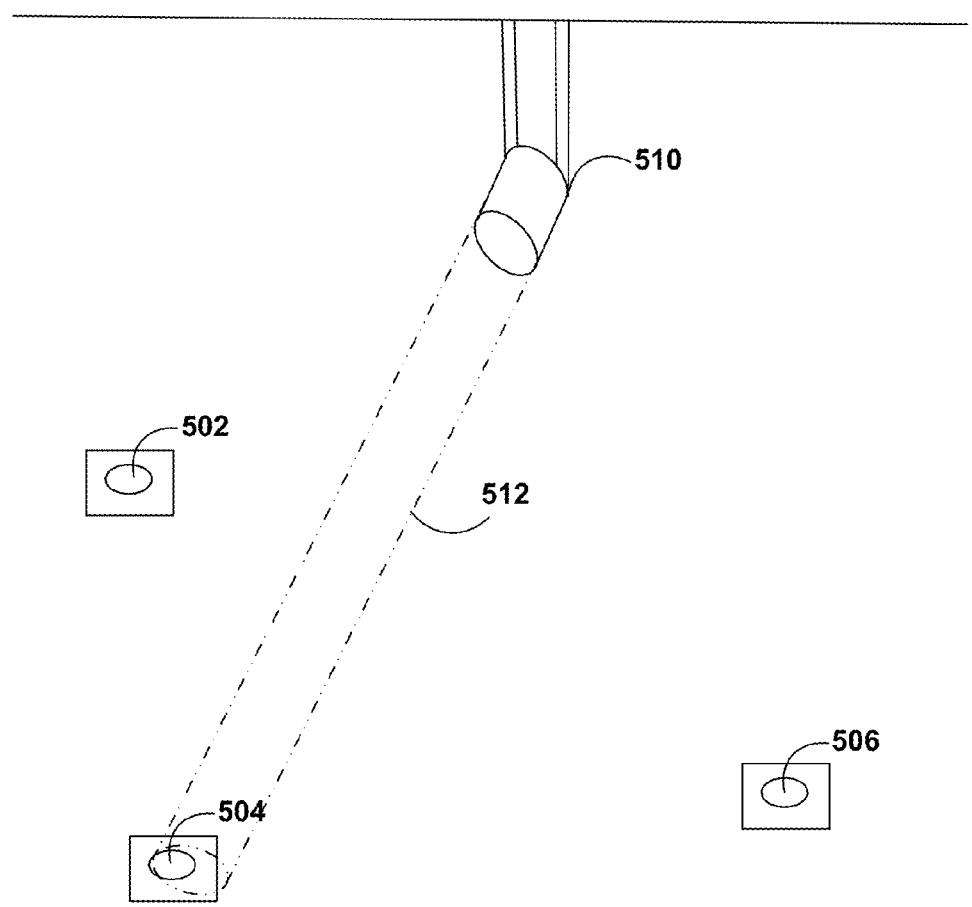
FIG. 5B illustrates a stage containing three photosensors and a light source projecting a light beam at a first photosensor, according to an example embodiment.

FIG. 5B shows another configuration of the light source and photosensors, according to an example embodiment. More specifically, FIG. 5B shows a light source 510 projecting a light beam 512 onto a different point of the stage. The orientation of the light source 510 (e.g., the pan and/or tilt) may be controlled to change the direction of the light beam 512. During this homing sequence, the light beam 512 may at some point be projected in a direction toward one of the photosensors 504, such that the photosensor 504 detects the presence of the light beam 512. The photosensor 504 may then send a signal to a control system indicating that a light beam has been detected. In some examples, the photosensors may each report a unique ID number back to the control system as well so that the control system can identify each photosensor.

Calibrating the light source may then involve determining orientations of the light source that cause a signal at one of the photosensors. As the light source is controlled to project a light beam around the stage during the homing sequence, a control system 104 may determine a commanded orientation that was used to control the light source whenever a signal is received from a photosensor indicating a sensing of a light beam. In particular, a closed loop system may be used so that the control system 104 may keep track of the commanded axis values sent to the light source (e.g., pan and tilt) that cause signals at one of the photosensors. The commanded axis values may represent commanded orientations of the light source relative to how the light source was mounted on the stage (which may be unknown). The orientations of the light source causing signals at one of the photosensors could be stored numerically in other ways as well, such as relative directions through space (or angles) from one photosensor to the next.

Referring back to FIG. 5B, when a signal is received from the photosensor 504 indicating the light beam 512 projected by the light source 510 hit the photosensor 504, the control system 104 may determine a commanded orientation that was sent to the light source 510. For example, the control system 104 may determine the pan and tilt assigned to the light source 510 which caused the signal. The pan and tilt values may indicate how much the pan and tilt of the light source 510 must be changed from an initial (possibly unknown) mounted orientation in order to cause the light source 510 to project the light beam 512 onto the photosensor 504.

In some examples, some of the light sources may contain some amount of built-in error in how commanded orientations correspond to true orientations. For instance, commanded orientations may cause a physical orientation of the light source that is off by a fraction of a degree. In such circumstances, to achieve greater precision, a function may first be determined that relates commanded orientations to true physical orientations of a light source. For instance, true orientations may be measured with an inclinometer or 3D-orientation sensor and compared to commanded orientations in order to determine the function. The function may then be used during the homing sequence to ensure that the determined orientations of a light source causing a signal at one of the photosensors are precise.

Figure 5C:
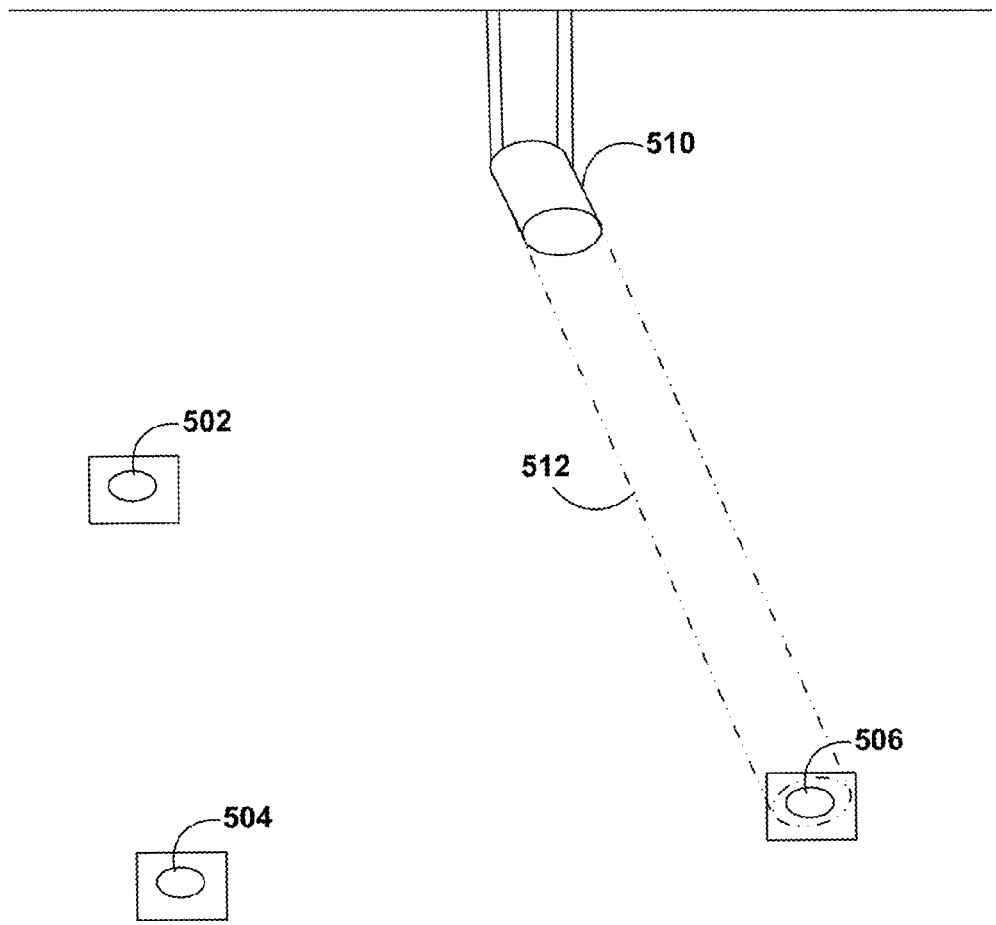
FIG. 5C illustrates a stage containing three photosensors and a light source projecting a light beam at a second photosensor, according to an example embodiment.
Figure 5D:
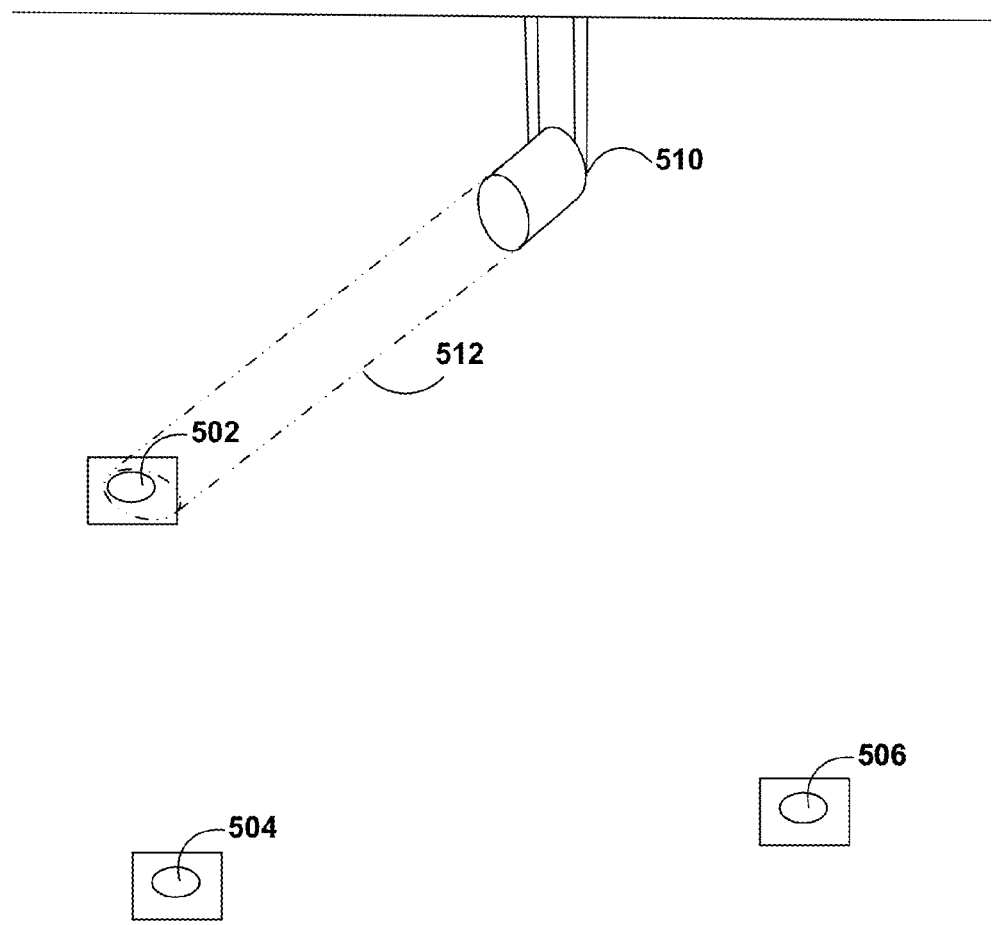
FIG. 5D illustrates a stage containing three photosensors and a light source projecting a light beam at a third photosensor, according to an example embodiment.

The homing process may then be continued until the light source has projected a light beam hitting at least two additional photosensors. For example, FIG. 5C shows the light source 510 projecting a light beam 512 that hits the photosensor 506. A signal may be received from the photosensor 506, and the control system 104 may record the commanded axis values (e.g., pan and tilt) of the light source 510 that caused the signal. After continuing the homing sequence, the light beam 512 projected by the light source 510 may then hit another photosensor 502, as shown by FIG. 5D. A signal may be received from the photosensor 502, and the control system 104 may again record the commanded orientation of the light source 502 that caused the signal, also keeping track of which photosensor corresponds to a particular commanded orientation of the light source. Collectively, FIGS. 5A-5D illustrate an example homing sequence during which the light source 510 has been oriented to project the light beam 512 at three photosensors 502 to 506.

Figure 6:
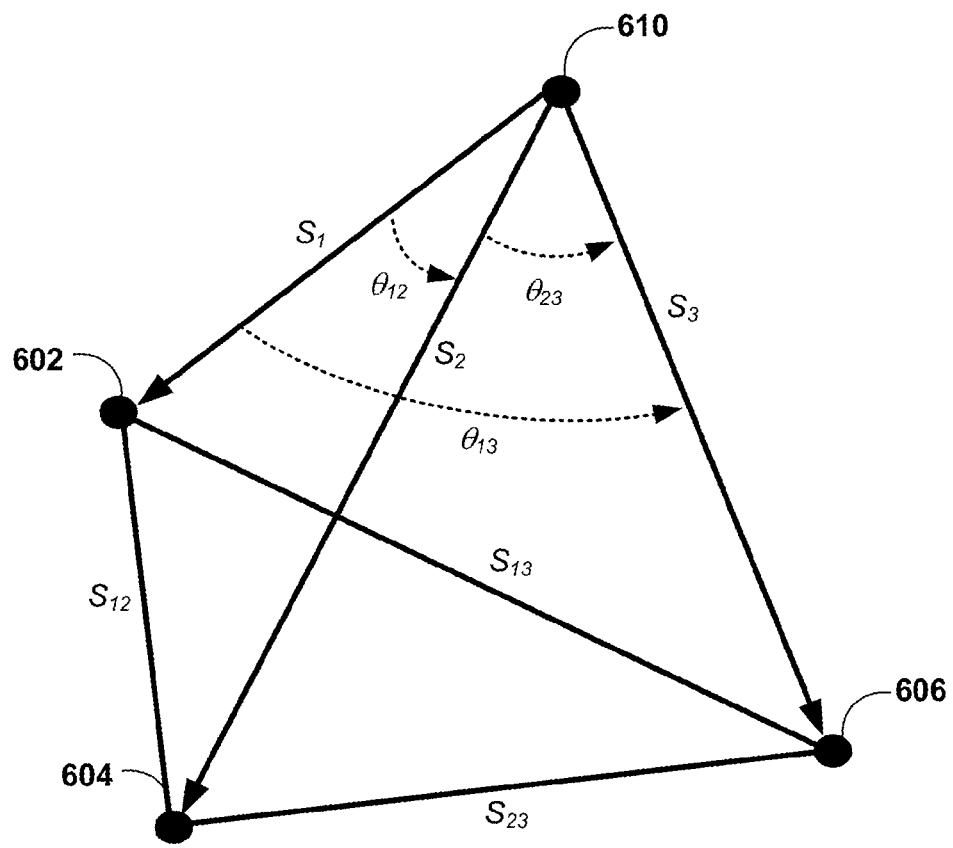
FIG. 6 illustrates directions toward three points with known locations, according to an example embodiment.

FIG. 6 illustrates an abstract representation of data acquired during a homing sequence, according to an example embodiment. The location of three points 602, 604, and 606 relative to a world frame may be known, representing the positions of three photosensors on a stage. The distances between any two of the points 602, 604, and 606 may therefore be computed as $S_{12}$, $S_{23}$, and $S_{13}$. Additionally, the relative directions through space between each of the known points 602, 604, and 606 from an unknown point 610 representing the location of the light source may be determined during the homing sequence. For instance, the difference in pan and tilt causing the light source to project a light beam hitting the point 602 and the pan and tilt causing the light source to project a light beam hitting the point 604 may be used to determine the angle $\theta_{12}$. Similarly, the angle $\theta_{23}$ may be determined based on the change in orientation of the light source from when the light beam hit the point 604 to when the light beam hit the point 606. Additionally, the angle $\theta_{13}$ may be determined based on the change in orientation of the light source from when the light beam hit the point 602 to when the light beam hit the point 606.

Calibrating the light source may then involve using the positions of the photosensors on the stage and the commanded orientations of the light source that caused a signal at one of the photosensors to determine a transformation from a local frame of the light source to the world frame. In particular, a translation and a rotation from the local frame of the light source to the world frame may be determined in order to determine how the light source is mounted on a stage (e.g., the position and orientation of the light source relative to the world frame). For example, the transformation may be determined by solving a geometry problem as illustrated by FIG. 6.

In particular, the distances (represented by $S_{12}$, $S_{23}$, and $S_{13}$ in FIG. 6) between the three photosensors may be determined based on the positions of the photosensors. Additionally, the three angles from the light source between any pair of photosensors (represented by $\theta_{12}$, $\theta_{23}$, and $\theta_{13}$ in FIG. 6) may be determined based on the homing sequence. This information may be used to solve for three unknown distances (represented by $S_1$, $S_2$, and $S_3$ in FIG. 6) between the location of the light source 610 and the locations of the photosensors 602, 604, and 606. For instance, the law of cosines may be used on each of three triangles formed by the light source position and two photosensor positions to determine three constraints:

$$S_{12}^2 = S_1^2 + S_2^2 - 2S_1S_2 \cos\theta_{12}$$

$$S_{23}^2 = S_2^2 + S_3^2 - 2S_2S_3 \cos\theta_{23}$$

$$S_{13}^2 = S_1^2 + S_3^2 - 2S_1S_3 \cos\theta_{13}$$

The three constraints can be used to determine values for the distances connecting the unknown point representing the light source in space to each of the known points representing the photosensors. In one example, a closed-form solution may therefore be determined for the distances $S_1$, $S_2$, and $S_3$, which may be used to determine position and/or orientation parameters of the light source. For example, an algorithm referred to as direct linear transformation may be used to first convert the system of three equations into a system of three linear equations, which can then be solved by a standard method (e.g., matrix row reduction).

A number of different possible algorithms could be used to determine the transformation as well. For instance, in some examples, the determined orientations of the light source may contain noise, in which case there may not be an exact solution. In such cases, a transformation may be determined that minimizes an amount of error (such as the mean squared error) in the determined position and orientation of the light source. For example, an iterative approximation algorithm could be used to determine an approximate position and orientation of the light source relative to the stage that minimizes an error term. In further examples, a closed-form solution may be used as an initial estimate for the optimization procedure.

In other examples, additional photosensors may be used to determine the transformation from a local frame of a light source to the world frame. For example, an orientation of the light source causing a signal at four or five or more photosensors may be determined during the homing sequence. Additional photosensors may be used to reduce error caused by imprecise measurements, for example. By capturing additional data, the system of equations used to solve for the transformation may be overdetermined (e.g., more constraints than degrees of freedom). In such examples, a solution for the transformation can be determined which minimizes a total amount of error in each of the determined directions towards photosensors on the stage (e.g., by minimizing the mean squared error in solutions to each of the determined constraints). Sensor data from additional photosensors may be incorporated to verify and/or refine determined positions and orientations of light sources in other ways as well. For example, in some instances, a closed-form solution for the overdetermined three-dimensional resection problem may be determined directly.

In additional examples, an optimization approach may be used in which the coefficients characterizing a light source (e.g., the relationship between commanded orientations and true orientations of the light source) serve as additional degrees of freedom. Such an approach may be useful when the light sources contain some built-in error between commanded and true orientations. By including the coefficients as additional degrees of freedom, the step described above of building a function to describe the relationship between commanded and true orientations can be avoided.

Figure 7:
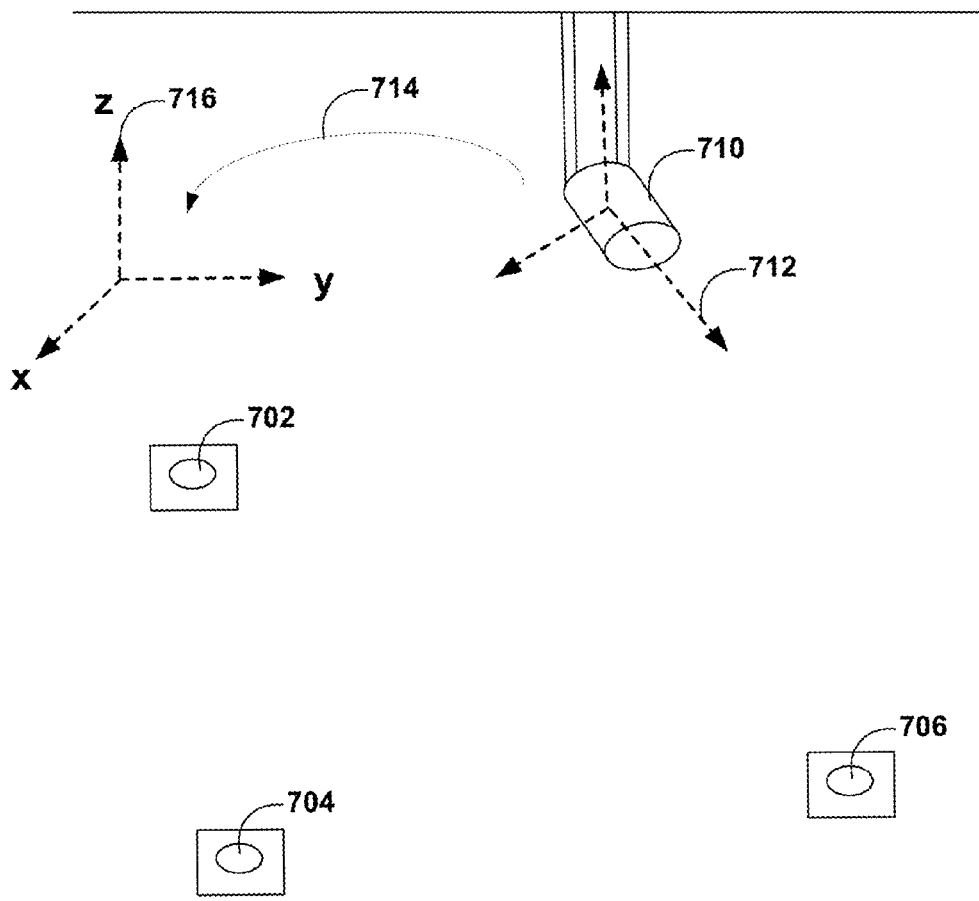
FIG. 7 illustrates a local frame of a light source and a world frame, according to an example embodiment.

FIG. 7 shows a local frame of a light source and a world frame, according to an example embodiment. The world frame 716 may be positioned somewhere within an environment and may first be used in determining positions of the photosensors 702, 704, and 706. Then, using the processes described above, a transformation 714 from a local frame 712 of the light source 710 to the world frame 716 may be determined. In particular, the local frame 712 of the light source 710 may indicate how the light source 710 is mounted within the stage (in this example, on the ceiling). Additionally, the transformation 714 may indicate how to translate and rotate the local frame 712 of the light source 710 to make it align with the world frame 716. In some examples, the transformation 714 may not be a full transformation in each translation and orientation direction. For instance, a light source may be mounted on the floor such that the vertical position of the light source relative to the stage is already known. In such examples, a transformation may be determined in only certain translation and/or orientation directions.

In further examples, various methods may be used to confirm the accuracy of a determined transformation and/or refine the transformation for further precision. For example, an optical target may be affixed on the light source at a predetermined point, with a known position relative to the local frame of the light source. A laser tracker, such as the laser tracker described above, may then project a laser beam toward a point in the world where the optical target on the light source should be, assuming the determined transformation was accurate. In some examples, if the transformation is off by a small amount, the transformation may be adjusted so that the optical target lines up with the laser beam from the laser tracker. In other examples, if the transformation is off by a greater amount (e.g., if the optical target is further away from the predicted location than a threshold amount), the homing sequence may be repeated to determine a new transformation.

In further examples, a hunting sequence may be used to refine the determined orientations of a light source that cause a signal at one of the photosensors. For instance, in some applications, a light source may project a light beam that is greater in size than each of the photosensors (e.g., 5 times greater or 20 times greater or 100 times greater). In such examples, a light beam may hit a photosensor without being directly centered over the photosensor. For example, a light source may project a light beam which is greater in size than a photosensor. Accordingly, the photosensor may trigger a signal whenever a certain part of the light beam is hitting the photosensor.

In such examples, an orientation of the light source may be determined such that the photosensor is located at a center point of the projected light beam using a centering sequence. In one example, the orientation of the light source may be controlled so that the light beam is first projected to the right of the photosensor. The light beam may be moved to the right until it reaches a point where the photosensor no longer sends a signal indicated that the photosensor is sensing the light beam. The orientation of the light source may be determined which projects the light beam just to the right of the photosensor.

Then, the orientation of the light source may be controlled so that the light beam is projected to the left of the photosensor. The light beam may be moved to the left until it reaches a point where the photosensor no longer sends a signal indicated that the photosensor is sensing the light beam. The orientation of the light source may be determined which projects the light beam just to the left of the photosensor. Then, an average of the orientation of the light source which projects a light beam to the right of the photosensor and the orientation of the light source which projects a light beam to the left of the photosensor may be determined to find an orientation of the light source that projects a light over the center of the photosensor in the left-right direction.

The process may then be repeated in the up and down direction (e.g., along the x-axis of the stage). First, the orientation of the light source may be controlled so that the light beam is projected above the photosensor. The light beam may be moved up until it reaches a point where the photosensor no longer sends a signal indicated that the photosensor is sensing the light beam. The orientation of the light source may be determined which projects the light beam just to the top of the photosensor.

Then, the orientation of the light source may be controlled so that the light beam is projected below the photosensor (e.g., along the x-axis of the stage). The light beam may be moved down until it reaches a point where the photosensor no longer sends a signal indicated that the photosensor is sensing the light beam. The orientation of the light source may be determined which projects the light beam just below the photosensor. Then, an average of the orientation of the light source which projects a light beam above the photosensor and the orientation of the light source which projects a light beam below the photosensor may be determined to find an orientation of the light source that projects a light over the center of the photosensor in the up-down direction. The determined orientation of the light source may now project a light beam such that the photosensor is at a center point of the light beam.

In additional examples, the light beam may be moved in different direction during the centering sequence. For instance, if a photosensor is mounted on a wall within a stage, the light beam may be moved up and down in the z-direction to determine when the photosensor is at the center of the beam in the z-direction. In additional examples, light beams may be moved along paths that don't align with one of the axes (e.g., at a 45 degree angle between the x-axis and the y-axis). In yet further examples, the centering sequence may be repeated in additional directions in order to achieve additional precision as well. For instance, the centering sequence may be repeated along the first axis again to ensure that the centering process is executed using the widest part of a light beam.

In further examples, a profile of the photosensor readings may be maintained during the centering process. The profile may be used to confirm that the center of a light beam corresponds to a measurement of highest intensity by the photosensor. In cases where the center of the light beam does not correspond to the highest intensity (or at least close to the highest intensity), the centering process may be repeated along different axes, for example.

In other examples, after centering a light beam, the size of the light beam may be decreased. If the photosensor still detects the light beam, the centering process may be repeated with the smaller beam to achieve additional precision. If the photosensor does not detect the smaller light beam, the centering sequence may be repeated with the normal-size light beam in order to achieve a more precise orientation. In any case where the centering process in repeated, if the centering process does not finish successfully after a certain number of retries, an error may be recorded and the homing sequence may continue using different photosensors.

In some examples, additional methods may be used to further refine determined transformations from a local frame of a light source to a world frame as well. For example, laser projectors may be mounted on the light sources, and laser beams from the laser projectors may be used along with a camera system capable of detecting where the laser beams are projected within a stage. The locations of the laser beams may be used to refine a determined transformation to provide greater precision during the homing sequence, for example. In additional examples, traditional computer vision methods may be used to determine the position of projected light beams within a stage in order to refine determined transformations as well or instead.

Once a light source has been calibrated relative to a stage, the light source may be controlled to project light beams at particular targets on the stage. For instance, the determined transformation from a local frame of the light source to a world frame may be used to determine how to orient the light source in order to project light beams at a particular point in space that corresponds to a point of a geometric. By determining a precise calibration of the light source, light beams from the light source may then be coordinated with other components on stage during a wide variety of different types of shows or performances, for example.

V. Example Systems and Methods for Calibrating Multiple Light Sources

In some examples, multiple light sources within an environment may be calibrated. Accordingly, the position and orientation of one light source relative to another may be determined so that the light sources may be controlled to project light beams in a coordinated manner, for instance, to illuminate a geometric. In some examples, the light sources may be calibrated in sequence, one after another, by using the same set of photosensors. In other examples, different groups of photosensors located in different sections of the stage may be used to calibrate different light sources at the same time. In additional examples, some or all of the photosensors may be used to calibrate multiple light sources simultaneously by detecting one or more identifying characteristics of detected light beams.

For instance, multiple light sources may be calibrated simultaneously during a single homing sequence by using color to distinguish light beams from different light sources. In some examples, the photosensors may be RGB photosensors capable of determining RGB values associated with the RGB colors of detected light beams. Additionally, the light sources may be capable of projecting light beams with different colors. A control system, such as the control system 104, may then be configured to command each of the light sources to project light beams with different RGB colors during the homing sequence. When a photosensor sends a signal indicating that it has detected a light beam, the photosensor may also report the color of the detected light beam. The control system 104 may then use the RGB color of the detected light beam to identify which light source projected the light beam during the homing sequence. In some examples, pure red, green, and blue light beams may be used to calibrate up to three light sources simultaneously. In other examples, colors that include a mix of red, green, and/or blue could be used as well to calibrate dozens of light sources or more at the same time.

For example, the control system 104 may cause a first light source to project a light beam with a first color. Additionally, a second light source may be controlled to project a light beam with a second color. The colors may be chosen to be sufficiently different that the photosensors may be capable of distinguishing between light beams of the different colors.

The control system 104 may then control the orientations of the two light sources to project the light beams of different colors in different directions during a homing sequence. At some point, a light beam from one of the light sources may hit one of the photosensors. The photosensor may detect the presence of a light beam as well as the color of the light beam. The control system 104 may then determine based on the color of the light beam that a particular light source projected the light beam which was detected by the photosensor. The control system 104 may keep track of the orientation of the light source that caused a signal to be sent by the photosensor as in the examples described above for calibrating a single light source.

The homing sequence may then be continued so that a light beam from one of the light sources may again hit one of the photosensors. The process may be continued until each light source has projected a light beam that was detected by at least three photosensors. Then, the procedure described above in the examples for calibrating a single light source may be used to determine the position and orientation of each light source relative to the stage. In some examples, the control system 104 may stop moving a light source during the homing sequence once the light source has been detected by three photosensors. In other examples, the control system 104 may continue to change the orientations of all of the light sources until every light source has been detected by at least three photosensors (e.g., to collect extra data in order to achieve greater precision in determining how and where the different light sources are mounted). Additionally, a light source may be temporarily turned off when directed at a photosensor that has already detected the light source.

In other examples, different identifying features of projected light beams may be used as well or instead in order to differentiate between light beams from different light sources. For example, each light source may be controlled to project a light beam with a different frequency, beam pattern, beam strength, beam size, or strobing pattern, for example. In some examples, multiple different properties of the light beams may be modified simultaneously in order to achieve greater confidence in differentiating between light beams from different light sources.

In additional examples, the control system 104 may be configured to automatically account for difficulties in identifying light beams from different light sources. For example, if the photosensors cannot distinguish between two colors of two light beams from different light sources, the control system may instruct one of the light sources to change the color of its light beam or the control system may turn off one of the light sources until the other light source has been fully calibrated.

In other examples, the light sources may be stopped and blinked separately during the homing sequence in order to identify which light source caused a signal at one of the photodetectors. For instance, during the scan, when one of the photosensors detects a light, all the light sources may be commanded to stop. At this point, if none of the photosensors detect a light, the light sources may not have stopped in time due to latency in communication. All the light sources may then be rewound (i.e., change their orientations in reverse) until a photosensor detects a light. Then, all of the light sources may be quickly blinked in succession in order to determine which light source caused a signal at the photosensor.

In some examples, a homing sequence may end when each of the light sources has been detected by a certain number of photosensors and/or when each of the light sources has scanned its entire envelope. In further examples, a control system may then report the results of a scan, including any errors in the process (e.g., when a photosensor could not detect a light source with sufficient precision). In some examples, some subset of the scans may be re-run and/or one or more refinement processes may be run using values collected in the previous iteration.

In additional examples, rather than submitting commanded orientation values for calibration at the end of the homing sequence, a control system may run a calibration determination system on-line, so that the estimates of the positions and/or orientations of light sources are refined while the homing sequence goes on. This may increase the speed of the homing process (e.g., by restricting the search space) and/or improve the accuracy of the homing sequence (e.g., by adjusting the focus of a beam based on the distance of a sensor to create "harder" edges of light beams for detection).

In further examples, any of the different examples of systems and methods described with respect to a single light source may be used to calibrate multiple light sources as well. For instance, a high-precision laser tracker may be used to verify the determined transformation for each light source. Any light source that has not been calibrated within a threshold error limit may then repeat the homing process in order to acquire additional position data, for example.

A stage containing dozens or hundreds of light sources may therefore be calibrated within a short time period. In some examples, a single control system, such as the control system 104, may communicate with all of the light sources and photosensors. In other examples, control may be dispersed across multiple computing devices, which may be in communication with one other through a wireless connection, for example. In additional examples, the photosensors may be connected by a mesh network so that detected signals can be sent from one photosensor to the next in order to reach a control system faster. Other configurations are also possible, depending on the properties of the stage and devices to be calibrated.

IV. Conclusion

The examples given in the preceding sections are meant for purposes of explanation and are not meant to be limiting. Other types of systems and/or applications may benefit from the disclosed systems and methods for controlling 3-D lighting arrangements as well, without departing from the spirit or scope of the subject matter presented herein.

Further, the above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

We claim:

1. A system comprising:
   an interface configured to communicate control instructions to a plurality of light sources; and
   a control system configured to:
   receive location data indicating a respective location of each light source within a volume;
   receive an indication to provide a geometric lighting arrangement, wherein the geometric lighting arrangement comprises a plurality of points having a pre-determined spatial relationship;
   determine a respective location, within the volume, of each point in the geometric lighting arrangement, wherein at least one of the light sources corresponds to each point; and
   for each light source that corresponds to one of the points, control the light source such that a light beam from the light source illuminates the location of the corresponding point within the volume, wherein, in order to control a given one of the light sources such that the light beam from the light source illuminates the location of the corresponding point within the volume, the control system is configured to (i) determine coordinates of the point within the volume and (ii) determine a pan parameter and a tilt parameter that positions the light source to emit light towards the determined coordinates.

2. The system of claim 1, wherein the location data for each light source comprises a set of three-dimensional coordinates corresponding to a location of the light source within the volume.

3. The system of claim 1, wherein the determined location of each point is defined by a set of three-dimensional coordinates within the volume.

4. The system of claim 1, wherein the geometric lighting arrangement comprises a particular shape.

5. The system of claim 1, wherein the control system is further configured to:
   receive an indication of a particular transformation; and
   determine, for each point in the geometric lighting arrangement, an associated sequence of locations within the volume that correspond to the particular transformation.

6. The system of claim 5, wherein the control system is further configured to:
   control the light sources such that the respective light beam from each light source moves through the associated sequence of locations within the volume, thereby providing the particular transformation.

7. The system of claim 5, wherein the control system is further configured to determine one or more parameters of the particular transformation, wherein the one or more parameters comprise one or more of: (a) x-axis translation, (b) y-axis translation, (c) z-axis translation, (d) x-axis rotation, (e) y-axis rotation, (f) z-axis rotation, (g) x-axis scaling, (h) y-axis scaling, and (i) z-axis scaling.

8. A method comprising:
   receiving, by a computing system, location data indicating a respective location of each of a plurality of light sources within a volume;
   receiving, by the computing system, an indication to provide a geometric lighting arrangement, wherein the geometric lighting arrangement comprises a plurality of points having a pre-determined spatial relationship;
   determining, by the computing system, a respective location, within the volume, of each point in the geometric lighting arrangement, wherein at least one of the light sources corresponds to each point; and
   for each light source that corresponds to one of the points, controlling, by the computing system, the light source such that a light beam from the light source illuminates the location of the corresponding point within the volume, wherein controlling a given one of the light sources such that the light beam from the light source illuminates the location of the corresponding point within the volume comprises (i) determining coordinates of the point within the volume and (ii) determining a pan parameter and a tilt parameter that positions the light source to emit light towards the determined coordinates.

9. The method of claim 8, wherein the location data for each light source comprises a set of three-dimensional coordinates corresponding to a location of the light source within the volume.

10. The method of claim 8, wherein the determined location of each point is defined by a set of three-dimensional coordinates within the volume.

11. The method of claim 8, wherein the geometric lighting arrangement comprises a particular shape.

12. The method of claim 8, further comprising:
    receiving, by the computing system, an indication of a particular transformation; and
    the computing system determining, for each point in the geometric lighting arrangement, an associated sequence of locations within the volume that correspond to the particular transformation.

13. The method of claim 12, further comprising:
    controlling, by the computing system, the light sources such that the respective light beam from each light source moves through the associated sequence of locations within the volume, thereby providing the particular transformation.

14. A non-transitory computer-readable medium having stored therein instructions executable by a computing system to cause the computing system to perform functions comprising:
    receiving location data indicating a respective location of each of a plurality of light sources within a volume;
    receiving an indication to provide a geometric lighting arrangement, wherein the geometric lighting arrangement comprises a plurality of points having a pre-determined spatial relationship;

determining a respective location, within the volume, of each point in the geometric lighting arrangement, wherein at least one of the light sources corresponds to each point; and for each light source that corresponds to one of the points, controlling the light source such that a light beam from the light source illuminates the location of the corresponding point within the volume, wherein controlling a given one of the light sources such that the light beam from the light source illuminates the location of the corresponding point within the volume comprises (i) determining coordinates of the point within the volume and (ii) determining a pan parameter and a tilt parameter that positions the light source to emit light towards the determined coordinates.

15. The non-transitory computer-readable medium of claim 14, wherein the geometric lighting arrangement comprises a particular shape.

16. The non-transitory computer-readable medium of claim 14, further comprising instructions executable by the computing system to cause the computing system to perform functions comprising:

receiving an indication of a particular transformation; and
determining, for each point in the geometric lighting arrangement, an associated sequence of locations within the volume that correspond to the particular transformation.

17. The non-transitory computer-readable medium of claim 16, further comprising instructions executable by the computing system to cause the computing system to perform functions comprising:

controlling the light sources such that the respective light beam from each light source moves through the associated sequence of locations within the volume, thereby providing the particular transformation.

18. A system comprising:
an interface configured to communicate control instructions to a plurality of light sources; and
a control system configured to:
  receive location data indicating a respective location of each light source within a volume;
  receive an indication to provide a geometric lighting arrangement, wherein the geometric lighting arrangement comprises a plurality of points having a pre-determined spatial relationship;
  determine a respective location, within the volume, of each point in the geometric lighting arrangement, wherein at least one of the light sources corresponds to each point;
  for each light source that corresponds to one of the points, control the light source such that a light beam from the light source illuminates the location of the corresponding point within the volume;
  receive an indication of a particular transformation;
  determine, for each point in the geometric lighting arrangement, an associated sequence of locations within the volume that correspond to the particular transformation; and
  control the light sources such that the respective light beam from each light source moves through the associated sequence of locations within the volume, thereby providing the particular transformation.

19. A method comprising:
receiving, by a computing system, location data indicating a respective location of each of a plurality of light sources within a volume;
receiving, by the computing system, an indication to provide a geometric lighting arrangement, wherein the geometric lighting arrangement comprises a plurality of points having a pre-determined spatial relationship;
determining, by the computing system, a respective location, within the volume, of each point in the geometric lighting arrangement, wherein at least one of the light sources corresponds to each point;
for each light source that corresponds to one of the points, controlling, by the computing system, the light source such that a light beam from the light source illuminates the location of the corresponding point within the volume;
receiving, by the computing system, an indication of a particular transformation;
the computing system determining, for each point in the geometric lighting arrangement, an associated sequence of locations within the volume that correspond to the particular transformation; and
controlling, by the computing system, the light sources such that the respective light beam from each light source moves through the associated sequence of locations within the volume, thereby providing the particular transformation.

20. A non-transitory computer-readable medium having stored therein instructions executable by a computing system to cause the computing system to perform functions comprising:

receiving location data indicating a respective location of each of a plurality of light sources within a volume;
receiving an indication to provide a geometric lighting arrangement, wherein the geometric lighting arrangement comprises a plurality of points having a pre-determined spatial relationship;
determining a respective location, within the volume, of each point in the geometric lighting arrangement, wherein at least one of the light sources corresponds to each point;
for each light source that corresponds to one of the points, controlling the light source such that a light beam from the light source illuminates the location of the corresponding point within the volume;
receiving an indication of a particular transformation;
determining, for each point in the geometric lighting arrangement, an associated sequence of locations within the volume that correspond to the particular transformation; and
controlling the light sources such that the respective light beam from each light source moves through the associated sequence of locations within the volume, thereby providing the particular transformation.

* * * * *